US010642990B2

United States Patent
Pattabhiraman et al.

(10) Patent No.: US 10,642,990 B2
(45) Date of Patent: May 5, 2020

(54) GENERATION OF DYNAMIC CONTEXTUAL PIVOT GRID ANALYTICS

(71) Applicant: Oracle International Corporation, Redwood Shores, CA (US)

(72) Inventors: Balaji Pattabhiraman, Karnataka (IN);
Rahul Mahashabde, Bangalore (IN);
Virad Gupta, Fremont, CA (US);
Deepankar Narayanan, Kerala (IN);
Raghu Edalur, San Ramon, CA (US);
Sai Jai Ganesh Gurubaran, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1 day.

(21) Appl. No.: 15/217,836

(22) Filed: Jul. 22, 2016

(65) Prior Publication Data
US 2017/0116426 A1    Apr. 27, 2017

Related U.S. Application Data

(60) Provisional application No. 62/246,033, filed on Oct. 24, 2015.

(51) Int. Cl.
*G06F 16/25* (2019.01)
*G06F 21/62* (2013.01)
(Continued)

(52) U.S. Cl.
CPC .............. *G06F 21/62* (2013.01); *G06F 16/25* (2019.01); *G06F 16/252* (2019.01); *G06F 16/26* (2019.01);
(Continued)

(58) Field of Classification Search
CPC .... G06Q 30/02; G06Q 10/06; G06Q 30/0215; G06Q 10/10; G06Q 30/0601;
(Continued)

(56) References Cited

U.S. PATENT DOCUMENTS 5,911,138 A    6/1999 Li et al.
6,317,750 B1   11/2001 Tortolani et al.
(Continued)

OTHER PUBLICATIONS

LitePoint IQramp; http://docs.evergreen-ils.org/2.1/html/generate-report.html.
(Continued)

*Primary Examiner* — Alex Gofman
*Assistant Examiner* — Linh Black
(74) *Attorney, Agent, or Firm* — Tarolli, Sundheim, Covell & Tummino LLP

(57) ABSTRACT

A system and method for facilitating timely end user creation, customization, and/or configuration of analytic reports in a computing environment, such as an enterprise-computing environment. An example method includes receiving configuration information characterizing one or more User Interface (UI) features to be incorporated into an analytic report; employing the configuration information to generate one or more database queries to selectively retrieve data from the database; using the configuration information and the one or more database queries to construct an analytic template; and publishing the analytic template so that the analytic template is accessible to one or more end users of the computing environment. In a more specific embodiment, the computing environment includes an enterprise-computing environment, and the one or more users include enterprise personnel. The configuration information, which may include user job role information, includes instructions for collecting context information to control user accessibility to (Continued)

the analytic template and data associated therewith in accordance with the context information.

17 Claims, 13 Drawing Sheets

(51) Int. Cl.
  *G06Q 10/10* (2012.01)
  *G06F 16/26* (2019.01)
  *G06F 40/186* (2020.01)
  *H04L 29/06* (2006.01)
(52) U.S. Cl.
  CPC ........ *G06F 21/6227* (2013.01); *G06F 40/186* (2020.01); *G06Q 10/10* (2013.01); *H04L 63/102* (2013.01)
(58) Field of Classification Search
  CPC . G06Q 40/123; G06F 17/2247; G06F 17/227; G06F 17/30126; G06F 17/30554; G06F 17/30572; G06F 17/30592
  USPC .......................... 707/600, 603, 527, 771, 779
  See application file for complete search history.

(56) References Cited

U.S. PATENT DOCUMENTS

| | | | |
|---|---|---|---|
| 6,581,054 B1 | 6/2003 | Bogrett | |
| 6,707,454 B1 | 3/2004 | Barg et al. | |
| 7,051,038 B1 | 5/2006 | Yeh | |
| 7,181,450 B2 | 2/2007 | Malloy et al. | |
| 7,315,849 B2 | 1/2008 | Bakalash et al. | |
| 7,333,982 B2 | 2/2008 | Bakalash et al. | |
| 7,334,223 B2 | 2/2008 | Kumar | |
| 7,590,652 B2 | 9/2009 | Passey et al. | |
| 7,698,348 B2 | 4/2010 | Walker et al. | |
| 7,805,400 B2* | 9/2010 | Teh | G06Q 10/10 707/600 |
| 7,912,845 B2 | 3/2011 | Barstow | |
| 7,941,394 B2 | 5/2011 | Error | |
| 7,970,728 B2 | 6/2011 | Honzal et al. | |
| 8,180,713 B1 | 5/2012 | Rigby et al. | |
| 8,359,299 B2 | 1/2013 | Angus et al. | |
| 8,640,037 B2 | 1/2014 | Goodwin et al. | |
| 8,661,023 B1 | 2/2014 | Chun et al. | |
| 8,751,544 B2 | 6/2014 | Mui et al. | |
| 9,210,056 B1* | 12/2015 | Choudhary | G06F 16/284 |
| 9,557,889 B2* | 1/2017 | Raleigh | G06F 3/0482 |
| 9,589,287 B2* | 3/2017 | Hill | G06Q 50/01 |
| 9,704,162 B2 | 7/2017 | Bhatia et al. | |
| 9,742,724 B2* | 8/2017 | Bailey | H04L 61/1547 |
| 9,813,064 B2 | 11/2017 | Low et al. | |
| 2002/0184187 A1 | 12/2002 | Bakalash et al. | |
| 2003/0033192 A1* | 2/2003 | Zyman | G06Q 10/06 705/7.36 |
| 2004/0122844 A1* | 6/2004 | Malloy | G06F 17/30592 |
| 2005/0160399 A1 | 7/2005 | Kumar | |
| 2005/0179684 A1 | 8/2005 | Wallace | |
| 2006/0004745 A1 | 1/2006 | Kuhn | |
| 2006/0173812 A1 | 8/2006 | Bahl et al. | |
| 2007/0244650 A1* | 10/2007 | Gauthier | G06Q 10/10 702/19 |
| 2008/0046808 A1 | 2/2008 | Malkin et al. | |
| 2008/0288889 A1 | 11/2008 | Hunt et al. | |
| 2009/0018996 A1* | 1/2009 | Hunt | G06Q 30/02 |
| 2009/0138247 A1 | 5/2009 | Chow | |
| 2009/0187815 A1 | 7/2009 | Becerra, Sr. et al. | |
| 2009/0216808 A1 | 8/2009 | Wallace | |
| 2009/0271238 A1* | 10/2009 | Himley | G06Q 10/10 705/325 |
| 2009/0319544 A1 | 12/2009 | Griffin et al. | |
| 2010/0156889 A1 | 6/2010 | Martinez et al. | |
| 2010/0251140 A1 | 9/2010 | Tipirneni | |
| 2012/0078845 A1 | 3/2012 | Kasbekar | |
| 2012/0123924 A1 | 5/2012 | Rose et al. | |
| 2012/0185425 A1 | 7/2012 | Reeves et al. | |
| 2012/0214142 A1 | 8/2012 | Togawa | |
| 2013/0055128 A1* | 2/2013 | Muti | G06Q 50/01 715/769 |
| 2013/0145244 A1 | 6/2013 | Rothschiller et al. | |
| 2013/0185624 A1* | 7/2013 | Appleyard | G06Q 10/10 715/234 |
| 2013/0197953 A1* | 8/2013 | Sholes | G06Q 10/0631 705/7.12 |
| 2013/0254075 A1* | 9/2013 | Ballaro | G06Q 10/087 705/27.1 |
| 2014/0019415 A1* | 1/2014 | Barker | G06F 17/303 707/643 |
| 2014/0188617 A1* | 7/2014 | Raman | G06Q 30/0261 705/14.58 |
| 2014/0208215 A1 | 7/2014 | Deshpande | |
| 2014/0249999 A1 | 9/2014 | Johnson et al. | |
| 2014/0280284 A1 | 9/2014 | Emmanuel et al. | |
| 2014/0282910 A1 | 9/2014 | Palmer et al. | |
| 2015/0066985 A1* | 3/2015 | T | G06Q 10/10 707/779 |
| 2015/0134694 A1* | 5/2015 | Burke | G06Q 10/00 707/769 |
| 2015/0220607 A1* | 8/2015 | Chakra | G06F 3/04842 707/722 |
| 2015/0381931 A1* | 12/2015 | Uhma | H04N 7/147 348/14.03 |
| 2016/0224320 A1* | 8/2016 | Jemiolo | G06Q 50/01 |
| 2017/0039765 A1* | 2/2017 | Zhou | G06T 19/006 |
| 2017/0235786 A9 | 8/2017 | Faith et al. | |

OTHER PUBLICATIONS

Creating a chart; https://docs.campaign.adobe.com/doc/AC6.1/en/RPT_Creating_new_reports_Creating_a_chart.html.
Assigning Hierarchies and Measures; http://help.infragistics.com/Help/Doc/LightSwitch/2012.2/CLR4.0/html/Pivot_Grid_Assigning_Hierarchies_and_Measures.html; Copyright 2012, downloaded circa Aug. 21, 2014; 5 pgs.
Defining Metadata (igOlapFlatDataSource); http://help.infragistics.com/Help/Doc/jQuery/2013.1/CLR4.0/html/igOlapFlatDataSource_Defining_Metadata.html; Copyright 1996-2013; downloaded circa Aug. 21, 2014; 9 pgs.
Microstrategy9 Basic Reporting; http://www2.microstrategy.com/producthelp/9.4/manuals/en/BasicReporting.pdf; Copyright 2013; downloaded circa Aug. 21, 2014; 490 pgs.
Business Intelligence: Multidimensional Data Anlysis; http://www8.cs.umu.se/education/examina/Rapporter/PerWesterlund.pdf; Aug. 20, 2008; 58 pgs.
OLAP Pivot Grid for WPF; https://www.syncfusion.com/products/wpf/bi-pivotgrid; Copyright 2001-2015; downloaded circa Aug. 21, 2014; 24 pgs.
VCL Pivot Grid; https://www.devexpress.com/Products/vcl/ExPivotGrid/; downloaded circa Aug. 21, 2014; 3 pgs.
Kinamu Reporter; http://dl.sugarforge.org/kinamureporter/02KReporter/V2.5/Release_Notes_v2.5.pdf; Apr. 2010; 30 pgs.
E21 Analytics; http://www.tgiltd. com/whitepapers/e21 analytics/E21Analytics%20Users%20Guide. pdf; downloaded circa Aug. 21, 2014; 62 pgs.
Understanding RadPivotGrid; http://www.telerik.com/help/wpf/radpivotgrid-started-understanding-pivot.html; Copyright 2002-2015; downloaded circa Aug. 21, 2014; 1 pg.
U.S. Office Action corresponding to U.S. Appl. No. 14/710,441, dated Apr. 5, 2018, pp. 1-28.
The "Pivot Charting" Document, WebGrid.net Enterprise 6.0, Copyright 2007, Intersoft Solution Corp, 52 pages.
IBM Corporation—"Content Analytics with Enterprise Search"; obtained at http://public.dhe.ibm.com/common/ssi/ecm/en/zzd03138usen/ZZD03138USEN.pdf; version 3.0; Jun. 2012; 8 pgs.
Meyer, David; SAP Marries Transaction Processing with Analytics by Putting Business suite on Hana; obtained at http://gigaom.com/2013/01l 11/sap-marries-transaction-processing-with-analytics-by-putti ng-business-suite-on-hana/; Jan. 11, 2013; 4 pgs.

(56) References Cited

OTHER PUBLICATIONS

Stolte, Chris, et al.; "Polaris: A System for Query, Analysis, & Visualization of Multidimensional Relational Databases"; http://graphics.stanford.edu/papers/polaris_extended/polaris.pdf; Jan.-Mar. 2002; 14 pgs.
Qlik View Business Intelligence; obtained at http://www.visualintelligence.co.nz/QlikView.php; downloaded Aug. 20, 2014; 3 pgs.
Qlik View Business Discovery Platform; obtained at http://www.qlik.com/en/explore/products/qlikview; downloaded Aug. 20, 2014; 4 pgs.
MicroStrategy Web; obtained at http://www.microstrategy.com/us/software/products/web; Copyright 2010; downloaded Aug. 20, 2014; 12 pgs.
U.S. Office Action corresponding to U.S. Appl. No. 14/710,448 dated Apr. 2, 2019.
U.S. Office Action corresponding to U.S. Appl. No. 14/710,441 dated Jun. 28, 2019.
Non Final Office Action for U.S. Appl. No. 14/710,441 dated Jun. 28, 2019.

* cited by examiner

GENERATION OF DYNAMIC CONTEXTUAL PIVOT GRID ANALYTICS

CROSS REFERENCES TO RELATED APPLICATIONS

This application claims priority from U.S. Provisional Patent Application Ser. No. 62/246,033, entitled DYNAMIC CONTEXTUAL PIVOT GRID ANALYTICS, filed on Oct. 24, 2015, which is hereby incorporated by reference as if set forth in full in this application for all purposes.

This application is related to the following applications, each of which is hereby incorporated by reference as if set forth in full in this application for all purposes:

1. U.S. patent application Ser. No. 14/710,448, entitled SUPPORT HIERARCHICAL DIMENSION ANALYSIS IN MULTI-DIMENSIONAL PIVOT GRIDS, filed on May 12, 2015;
2. U.S. patent application Ser. No. 14/710,441, entitled EMBEDDING ANALYTICS WITHIN TRANSACTION SEARCH, filed on May 12, 2015; and
3. U.S. patent application Ser. No. 15/217,847, entitled DISPLAY OF DYNAMIC CONTEXTUAL PIVOT GRID ANALYTICS, filed on Jul. 22, 2016, which issued as U.S. Pat. No. 10,331,899 on 25 Jun. 2019.

BACKGROUND

The present application relates to computing, and more specifically to software, User Interfaces (UIs), methods, and accompanying systems for retrieving, arranging, and/or displaying data from a database.

Methods for arranging or displaying data from databases are employed in various demanding applications, including systems for facilitating scientific, educational, and enterprise data analysis. Such applications often demand user-friendly efficient systems that facilitate rapid, timely, and pertinent mechanisms for facilitating data analysis by an end user.

Systems facilitating rapid and insightful end user data analysis are particularly important in enterprise-computing environments and accompanying software systems, which may include thousands of client devices communicating in real time with a database (that may be hosted on a cloud or on premise) to access and/or modify data and/or functionality thereof, and where timely construction of insightful analytics by end users (e.g., enterprise employees) may facilitate informed decision-making throughout the enterprise.

Example enterprise systems include Business Intelligence (BI), Performance Management (PM), Supply Chain Management (SCM), Human Capital Management (HCM), other Enterprise Resource Planning (ERP) system, and so on. Such systems may communicate with one or more databases to gather and present information to enterprise personnel, e.g., via one or more Web pages or other application UIs. The pages may present data pertaining to one or more enterprise transactions. The pages often include one or more developer-created reports, which are limited in flexibility to manipulate/edit/customize by the end-user.

Conventionally, end users of such systems lack sufficient technical knowledge to develop custom or personalized on-demand reports. Generally, a developer, technician, or administrator with specialized skills creates reports in response to end user requests. However, such report-creation processes can be slow and costly, and the administrators may lack full awareness of sought report features. Accordingly, such systems generally lack effective features for enabling rapid or real-time generation and customization of the reports that can account for rapidly changing enterprise data analysis needs.

Furthermore, large enterprises, which may include thousands of employees, may accumulate many disparate analytic reports created by different contracted developers, which may not uniformly conform to enterprise data security policies. Accordingly, use of such conventional report-creation methods and systems generally do not afford consistent and uniform multi-layered security features, thereby potentially reducing enterprise control over data security.

SUMMARY

An example method facilitates timely end user creation, customization, and/or configuration of analytic reports in a computing environment, such as an enterprise-computing environment. The example method includes receiving configuration information characterizing one or more UI features to be incorporated into an analytic report; employing the configuration information to generate one or more database queries to selectively retrieve data from the database; using the configuration information and the one or more database queries to construct an analytic template; and publishing the analytic template so that the analytic template is accessible to one or more end users of the computing environment.

In a more specific embodiment, the computing environment includes an enterprise-computing environment, and the one or more users include enterprise personnel. The configuration information includes instructions for collecting context information to control user accessibility to the analytic template in accordance with the context information. The context information includes, but is not limited to, the user role information.

The configuration information may further include one or more security settings specifying which of the enterprise personnel using the computing environment may access the analytic template in accordance with the user role information pertaining to the enterprise personnel. The configuration information may further include a first security setting specifying which of the one or more database queries of the analytic template will retrieve data for use by the enterprise personnel in accordance with user role information pertaining to the enterprise personnel. The configuration information may further include instructions for obtaining additional context information pertaining to one or more UI display screens and data associated therewith, the data pertaining to one or more enterprise transactions that are respectively associated with the one or more UI display screens.

The one or more UI display screens may represent one or more enterprise application pages (e.g., transaction pages) of an enterprise application UI component. The additional context information may include data available in one or more fields of the one or more UI display screens, i.e., application pages. The additional context information may further include data retrieved from one or more user entries responsive to one or more user prompts. The one or more user prompts may be displayed during configuration of the analytic report template and/or the analytic report that is based on the analytic report template.

The configuration information may further include information associating the one or more enterprise application pages with the analytic template, such that when published, the analytic template will be accessible to one or more end users, e.g., enterprise personnel, of the computing environment via the one or more enterprise application pages.

A developer, administrator, or other capable or authorized user may specify the configuration information for the analytic template. The analytic template may then be selectively accessed by one or more end users in accordance with context information, including enterprise application page data, user role information, and so on.

The example method may further include providing one or more UI controls in the one or more enterprise application pages, wherein the one or more UI controls facilitate enabling one or more end users to use the analytic template to construct an end-user analytic report. The one or more UI controls include a template-access control, e.g., a button, link, etc.

The publishing step may further include providing the template-access control in the enterprise application page. The template-access control enables activation of software for facilitating end-user editing of the analytic template to yield the end-user analytic report. The software may include an analytic report construction wizard for guiding an end user during editing (e.g., customization and/or configuration) of the analytic template to facilitate construction of the analytic report.

The analytic template may represent a UI model that is described by one or more default settings for an analytic report that is to be constructed or customized by an end user (e.g., enterprise personnel) based on the analytic template. The one or more default settings characterize a layout of an initial analytic report to be populated with data from the database using the one or more database queries. The queries are run when activating an analytic report that has been developed by an end user who leverages the analytic template. The analytic report is activated in response to end-user selection of an associated UI control in the application page (or landing page).

The one or more database queries may include a composite query comprising plural database queries. The composite query may further incorporate or leverage access criteria specifying role-level security in accordance with user role information.

In a specific implementation, the plural database queries include one or more Structured Query Language (SQL) queries. The example method may then further include automatically generating the one or more SQL queries of an analytic report (that is based on the analytic template) in response to an end user accessing the analytic report, e.g., by activating, running, or otherwise triggering display thereof.

The one or more SQL queries may be used to retrieve data for the analytic report from a running enterprise database in accordance with report configuration information, wherein the report configuration information represents a description of the UI model. The report configuration information may represent a user-modified version of the configuration information that characterizes the analytic template.

The description of the UI model may include an indication that an accessed version of the analytic report will include a combination of a pivot grid, a data visualization, and one or more prompts that can be modified to filter data and facets that can be multi selected to further filter the data displayed via the pivot grid and data visualization. The retrieved data is sourced for the analytic report from the running enterprise database.

Hence, certain embodiments discussed herein facilitate construction of reusable analytic templates based on queries. The queries are used to selectively populate UI features of an analytic report with data, wherein the analytic report is derived from, based on, or otherwise built by an end user leveraging the analytic template. The queries incorporate instructions for retrieving current data from a live multi-tenant database.

Furthermore, the queries may implement security joins that leverage context information, such as user role, to ensure that the analytic report does not show data for which the user is not authorized to view in accordance with a security policy.

Furthermore, the queries are configured in accordance with transaction page data from which the analytic report is activated, such that the analytic report will show data that is related to or associated with a transaction characterized by data shown in the application page. In addition, enterprise application pages that provide options for activating and viewing the analytic report are selectively chosen (for publishing thereto) based on additional context information that defines which application pages are to provide access to the analytic report.

Accordingly, by enabling an administrator, developer, or other authorized user to construct and configure analytic templates, which are then reusable by end users to construct customized analytic reports, various advantages are achieved. End users can now rapidly develop informative and insightful analytic reports that incorporate relevant content. The insightful reports reflect available context information and real time or recent data. The context information is further usable to automatically implement multi-layered security policies.

Hence, various embodiments discussed herein provide efficient mechanisms for enabling administrators or developers to construct and publish analytic templates, which may include various default settings and configurations. The analytic templates and associated configurations may then be employed by end users to generate the real time context-based reports in accordance with context of the current page. The analytic reports may incorporate one or more pivot grids, associated visualizations, filters, controls for triggering related actions, and so on, all of which may be configurable, and which may be populated by current data from a live database upon end user activation of the analytic reports.

In summary, one or more configurable queries, which may include database table joins, may selectively leverage context information, including user selectable context information (e.g., via data available in one or more page fields and/or data provided in one or more prompts of the analytic report). Initially, administrator-specified default configuration information defining the queries is incorporated into one or more analytic templates, which are then associated with (and made accessible via) one or more enterprise application pages and/or associated application components (which may include one or more enterprise application pages).

The context information may further determine which types of analytic reports a user may create (e.g., as determined by which types of analytic templates are accessible to the end user); where the reports may be published; what data may be included in the report; what reports are visible to the user, and so on.

Accordingly, various embodiments discussed herein provide efficient user-friendly systems and methods that leverage query-based analytic reusable report templates to facilitate rapid on-demand construction and customization of reusable, timely, and pertinent analytic reports by authorized end users.

A further understanding of the nature and the advantages of particular embodiments disclosed herein may be realized by reference of the remaining portions of the specification and the attached drawings.

DETAILED DESCRIPTION OF EMBODIMENTS

Figure 1:
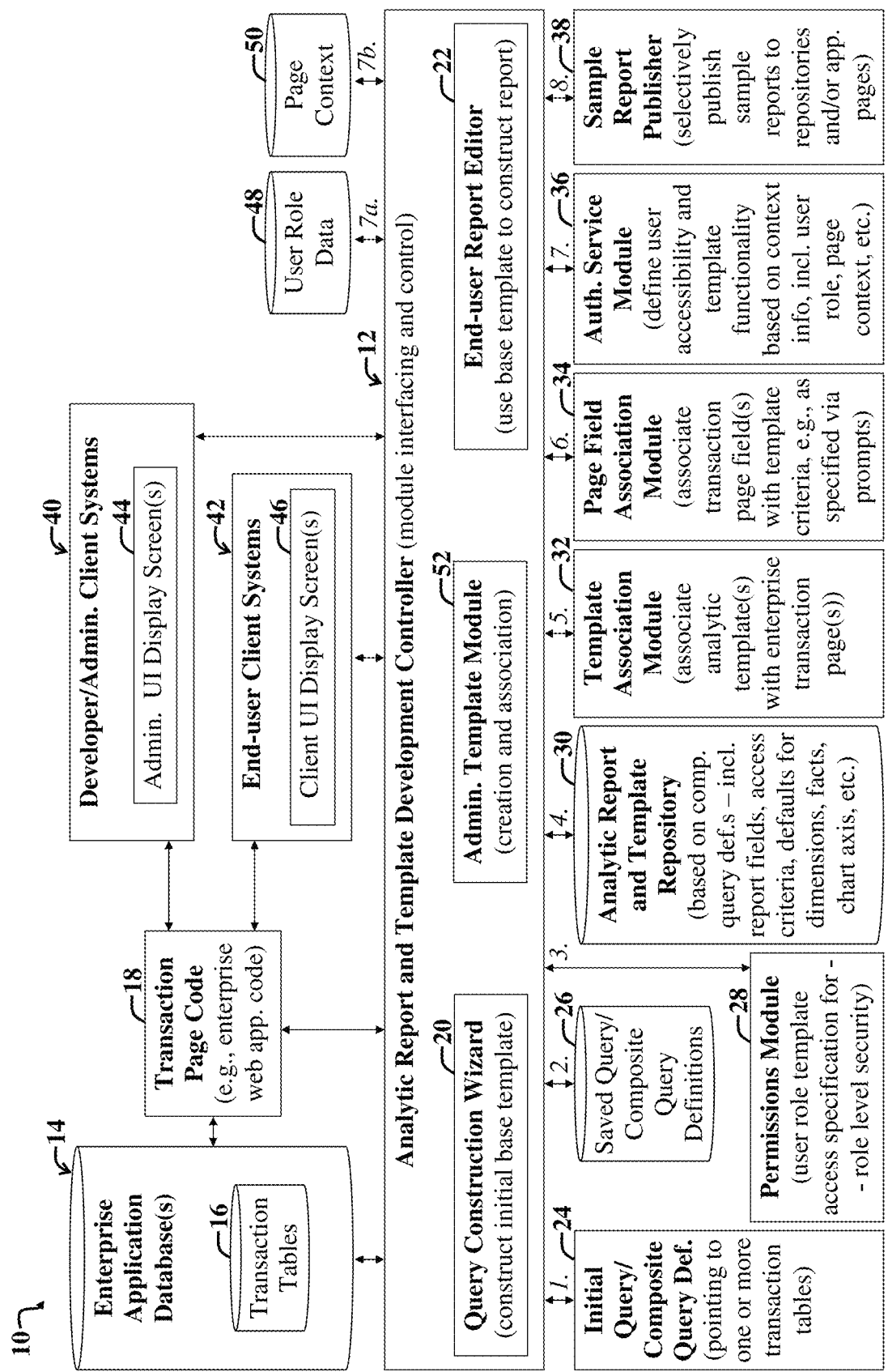
FIG. 1 is a block diagram illustrating a first example system and accompanying enterprise-computing environment configured to selectively enable development, deployment, and use of analytic templates and associated analytic reports in accordance with context information and an enterprise security policy.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display.

A UI display screen generated by a networked software application and accessible via a browser is called an application page (or simply page) herein. A UI component may be an application page or collection of related or linked pages.

An enterprise-computing environment may be any collection of computing resources of an organization used to perform one or more tasks involving computer processing. An example enterprise-computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a database may be any collection of data. Similarly, an enterprise database may be any collection of enterprise data, e.g., a transaction. An enterprise database may sometimes refer to or otherwise include enterprise software, such as Business Intelligence (BI), Customer Relationship Management (CRM), other relational database software, and so on, that is used to access stored enterprise data, also called business data herein.

A transaction may be any instance of or occurrence of one or more events, units of work, or processing steps and/or associated data related to an activity or process, e.g., business activity, and which may be grouped based on the activity or process. Similarly, transaction data may be any data characterizing or associated with an object, e.g., a business object, used as part of the transaction.

Note that the term "transaction" as used herein may have a different meaning than the conventional notion of a database transaction. Conventionally, a database transaction may be any change in a database associated with a unit of work, whereas, as the term "transaction" is used herein, a transaction may include data and functionality associated with a business object, and need not refer specifically to the operation of committing the business object for storage in a database. For example, depending upon the context in which the term "transaction" is used herein, the transaction may refer to a particular unit of work; a particular corresponding UI display screen section (e.g., transaction page) for enabling user interaction with the transaction; the combination of several disparate units of work via a transaction container; data maintained in one or more objects associated with the transaction, and so on, as discussed more fully below.

A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment.

A business object may be any object used to organize information for business purposes. An example business object may be formed by creating a name for the business object, such as "CRM Opportunity 1" or "Goal 1" and then associating information with the name. For example, "CRM Opportunity 1" object may be associated with a conversation, one or more enterprise personnel, one or more kudos assigned to a team that is associated with the object, and so on. Data that is associated with a business object may be contained within a data structure or database associated with the object, or the information may be distributed among different applications, computers, and so on, without departing from the scope of the present teachings.

For the purposes of the present discussion, multi-dimensional data may be any data that can be partitioned by interrelated groupings or categories. A data dimension, often simply called "dimension," may be any category, such as an amount category, used to group or categorize data.

Various embodiments discussed herein provide systems, frameworks, and methods for facilitating implementing efficient end user construction of analytic reports based on preconfigured analytic templates, which in turn may be developed and published (for reuse by end users) by administrators, developers, and/or other skilled or authorized users.

An analytic may be any calculation or measurement based on a given input. Certain analytics may be displayed graphically. For example, an analytic that calculates a degree of a match between a user and a candidate position based on information about the user and various candidate positions may be displayed via a bar chart, such as a qualification bar chart. In general, a graphically displayed analytic or other visual representation of data is called a visualization herein.

Accordingly, an analytic may manifest as any UI feature or combination of UI features (e.g., charts, pivot grids, filters, other UI controls, etc.) or content for facilitating data analysis. In some instances, the terms "analytic," "analytic report," and simply "report" are used interchangeably to refer to a UI framework or layout (also called the definition of the "shape" of the report) used to display the analytic when the analytic report is activated.

An analytic report may be any UI framework, model, and/or layout that includes information for rendering one or more analytics and associated UI display screens, and further includes one or more mechanisms (e.g., queries) for implementing data retrieval instructions (e.g., for retrieving data for the analytic report from a database).

An activated or displayed analytic report may be any UI display screen showing one or more analytics, wherein the associated analytic report has been populated with data (including any calculated, filtered, or otherwise processed data). An analytic report is said to be populated with data if data for rendering one or more charts, pivot grids, tables, or other data visualizations used in the report is retrieved from one or more databases and coupled with and/or displayed in an activated analytic report.

Examples of activated and populated analytic reports are discussed and shown more fully in the above-identified and incorporated U.S. Patent Applications entitled EMBEDDING ANALYTICS WITHIN TRANSACTION SEARCH and UI FOR CONTEXTUAL PIVOT GRID ANALYTICS.

In various embodiments discussed herein, analytic reports are selectively populated with current data that is selectively retrieved from a running enterprise database in accordance with a security policy. The data retrieval is performed by using queries that are defined as part of the analytic report. The queries may be configured with security features that leverage context information, e.g., user role information; associated application page data (i.e., transaction page data); and any additional information, as may be provided via user inputs responsive to one or more prompts. The prompts may be included in the analytic report, and/or in a configuration wizard used to construct or configure the analytic report. The terms "analytic report," "pivot grid model," "analytic layout," and "analytic model," may be employed interchangeably herein. Similarly, the terms "analytic" and "pivot grid" may be used to refer to the associated analytic reports.

For the purposes of the present discussion, a report template may be a type of analytic report that has been preconfigured with presets or defaults (e.g., default configuration information characterizing the layout/model representing the analytic template), which may then be used by an end user to further generate or create an on-demand personalized report by editing or further configuring the report template, e.g., via use of a software wizard. Software wizards for constructing analytic reports and associated templates may be called pivot grid wizards.

The terms "report template," "base template," "analytic template," "base pivot grid model," and simply "template," may be employed interchangeably herein. Certain analytic templates discussed herein include one or more fields, filters, other UI controls, query definitions, security settings, and so on, to be used when activating an analytic report based on the analytic template.

Various analytic templates discussed herein are said to be built on top of one or more queries, which may include composite queries. The analytic templates may be viewed as (i.e., considered to be) UI models that are configured to retrieve data from a database in accordance with predetermined configuration settings (e.g., SQL parameters that leverage page context in combination with user prompt input and user job role information) specified in the model.

Accordingly, the example analytic templates discussed herein may represent UI display screen architectures or frameworks that describe a so-called shape or layout of the UI display screen. Such an architecture or framework defines various features or aspects of the UI display screen in accordance with configuration information, e.g., information describing the types of visualizations, charts, tables, filters, UI controls, fields, sections, headers, security features, and so on. The various features may be associated with queries used to retrieve data from the database. The retrieved data is then used to selectively populate fields and other features of the analytic report based on the retrieved data and in accordance with a security policy. The retrieved data may be selectively retrieved in accordance with page context, i.e., information available in an associated transaction page and usable to ensure that content of the resulting displayed analytic report is related to the page context from which the report was launched.

Various embodiments discussed more fully below enable a user to navigate to an application page (i.e., UI display screen of an enterprise application); then select an option to begin creation and/or activation of one or more related analytic reports based on preconfigured analytic templates. End users may now readily create their own reports based on the predefined templates, e.g., by selecting the fields, filling the prompt fields, defining the layout, selecting different types of visualizations, and so on. Administrators create and publish analytic templates for use by other authorized end users and in accordance with application page context.

Note that to enable generation of analytic templates and/or reports from an application page or component, application developers or business administrators associate one or more analytic templates with the page or component. The developers or administrators may also map page fields to UI prompts that are associated with the analytic template, e.g., so as to define required context information, as discussed more fully below.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain Web services, virtual machines, middleware, and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise-computing environment configured to selectively enable development, deployment, and use of analytic templates and associated analytic reports, in accordance with context information and an enterprise security policy.

The example system 10 includes one or more enterprise databases (also called enterprise application databases herein) 14 in communication with an analytic report and development controller 12, and in further communication with enterprise application page code 18 for rendering application pages in a browser of one or more client systems 40, 42. The client systems 40, 42 include one or more developer or administrator client systems 40 (also simply called administrator clients) and end user client systems 42 (also simply called end user clients).

Note that while not shown in FIG. 1, the transaction page code 18 may be implemented via a Web server that is accessible to the clients 40, 42, e.g., via browsers that illustrate a first set of one or more administrator UI display screens 44 and a second set of one or more client UI display screens 46, respectively. The client systems 40, 42 may communicate with the transaction page code 18 via a network, such as the Internet.

The analytic report and development controller 12 and associated modules 20-38, 48, 50, 52 may be implemented via an application server in communication with the transaction page code 18 (also called enterprise Webpage code or application page code).

For the purposes of the present discussion, a server may be any computing resource, such as a computer and/or software that is adapted to provide content, e.g., data and/or functionality, to another computing resource or entity that requests it, i.e., the client. A client may be any computer or system (e.g., Web browser) that is adapted to receive content from another computer or system, called a server. A server system may be any collection of one or more servers and accompanying computing resources.

The analytic report and template development controller 12 is in communication with the client systems 40, 42, the application page code 18, the enterprise application database(s) 14, and various additional modules 24-38, 48, 50, 52. The analytic report and template development controller 12 acts as a module-interfacing mechanism and controller (as discussed more fully below), and includes an end-user analytic report editor 22, a query construction wizard 20 and associated administrator template module (also called a template creation and association module) 52. The query construction wizard 20, administrator template module 52, and end-user analytic report editor 22 may include or represent one or more software wizards for facilitating generation of analytic templates and associated analytic reports.

The various additional modules 24-38, 48, 50, 52 that are interfaced by the analytic report and template development controller 12 include an initial query/composite query definition module 24, a saved query/composite query repository or database 26, a user permissions module 28, an analytic report and template repository or database 30, a template association module 32, a page field association module 34, an authorization service module 36, a sample report publishing module (also simply called a sample report publisher) 38, a user role data repository or database 48, and a page context repository or database 50. Note that the various repositories 26, 30, 48, 50, 52 may be implemented via the enterprise application database(s) 14.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the end-user client systems 42 and the developer systems 40 may be implemented via the same computer system, without departing from the scope of the present teachings. Furthermore, certain server-side modules (i.e., running on a server or server system) may be implemented client-side (e.g., running on a client computer communicating with a server), and vice versa, in a manner different than shown in FIG. 1.

Various modules, e.g., modules 24-38, 48, 50, 52 may be selectively activated and driven in accordance with administrator and/or other end-user interaction with the query construction wizard 20 and/or end user report editor 22 (both of which may be implemented via software wizards) of the analytic report and template development controller 12. Note that in the present example embodiment, the query construction wizard 20 initially generates one or more queries/composite queries 24; then the one or more generated queries/composite queries 24 become input to the template creation/association module (also called the administrator template module) 52. Administrators and/or users may access the query construction wizard 20 and report editor 22 via the client systems 40, 42, and associated UI display screens 44, 46, respectively.

The initial query definition module 24 includes computer code for facilitating construction of one or more queries and/or composite queries based on input provided via the query construction wizard 20 and associated UI display screens 44. Note that in the present example embodiment, end-user action (e.g., as implemented via the end-user report editor 22) does not result in generation of any new query definition(s) or updating of any saved query definition(s). The existing query definition (saved in database 26) is only modified on the fly at runtime (based on user selection(s)) and executed while creating and viewing a new report. Only the new report definition (metadata about the shape and selection(s) applicable to the analytic report) is saved to the database 26, and the created reports then reuse the same query/composite query definition(s) from the base template. Furthermore, note that the initially constructed queries point to one or more transaction tables 16 in the enterprise database(s) 14 and may include security joins that selectively join table data in accordance with the query definitions and one or more enterprise security policies, as discussed more fully below.

Note that in general, queries are used to retrieve data based on specific criteria. Query joins (e.g., Structured Query Language (SQL) joins) may combine records (e.g., columns, rows, fields, etc.) from plural tables 16 in the enterprise database(s) 14. Generally, a query join represents a mechanism for combining data from different tables by using common or shared values thereof. In some cases, joins may involve selective combining of data from within a single table, in an operation called a self-join. Query join statements typically identify table data that is to be joined based on criteria, i.e., a predicate. If the criteria is satisfied, i.e., the predicate evaluates to true, the resulting combined data is then retrieved into a combined data object, e.g., a temporary table, that exhibits a particular format as may be used by analytic templates and analytic reports.

After the queries for a given analytic template or analytic report are constructed, e.g., via administrator interaction with the query construction wizard 20, the resulting query/composite query definitions are saved in the query/composite query repository 26. The saved queries/composite queries may be used and reused by various modules of the system 10 to facilitate construction of additional templates and associated reports.

The permissions module 28 includes computer code for leveraging user role information, e.g., enterprise job role data (also simply called user role data) 48 to specify what data can be retrieved from the enterprise transaction tables 16 and incorporated into or otherwise displayed in an analytic template or report, where the data that can be retrieved and displayed in a particular case depends upon user role information and any associated enterprise security policy. The specification as to what data can be retrieved and accessed by a particular end user can be configured using one or more automatically generated query security joins.

Note that whether or not a particular user (or collection of users associated with a particular job role) may access and/or manipulate particular enterprise data, may be determined by an enterprise security policy, and may vary depending upon the needs of a given implementation. For example in some cases, a manager may have employees that report to the manager (i.e., are subordinate to the manager) as part of the manager's team. While the manager may have permissions to access data pertaining to subordinate employees or enterprise personnel, subordinate employees may not necessarily have access to view and/or manipulate data of other employees holding similar subordinate positions. Security features implemented at the query level via the permissions module 28 (and associated query security joins) are called role-level security features herein.

The analytic report and template repository 30 stores preconfigured analytic templates and end-user-created reports that may be accessed by and further configured or edited by authorized end users. Note that in the present example embodiment, end users can update analytic reports they have access to. Administrators are given access to templates. End users are not authorized to edit base templates. Furthermore, note that the analytic templates and analytic reports stored in the repository 30 are based on query and/or composite query definitions associated with the reports and selectively pulled from or accessed via the query/composite query repository 26 and/or directly from the initial composite query definition module 24 via the interfacing controller 12.

The analytic templates and analytic reports stored in the analytic report and template repository 30 may include configuration information in addition to the references to the associated queries. The configuration information may include, for example, specifications of report fields, access criteria/permissions, defaults for data dimensions, facts, chart axis, pivot grid axis, and so on.

The template association module 32 includes computer code (e.g., a related content framework) for associating analytic templates with one or more enterprise transaction pages. The enterprise transaction pages represent application pages that are generated by the transaction page code 18 in communication with the enterprise database(s) 18.

The page field association module 34 includes computer code for associating enterprise transaction page (i.e., application page) fields with template criteria and associated conditions, e.g., as may be specified via one or more prompts that are provided by the query construction wizard 20, administrator template module 52, and/or the end user report editor/constructor (report wizard) 22.

Note that by selectively associating fields of a transaction page with criteria (used by queries to selectively retrieve data) of an analytic template or analytic report, the page field association module 34 leverages page context to facilitate determining what data to display in an analytic report or template associated with the application page from which the template and/or report was launched. The selective page field associations may also implement an added layer of security (e.g., beyond role-level security) extending beyond mere user role or permissions-based security.

For example, certain page fields may inform the controller 12 that the current analytic report to be activated or run has been launched from an application page with one or more hidden security fields or visible transaction page fields (e.g., displayed regular page field values), where the template author (e.g., administrator) has specified that when such security fields (which may include hidden and/or visible transaction page fields) exist on an application page, that certain enterprise data should or should not be shown in the associated analytic report. Such additional security specifications may be automatically generated in response to administrator input provided via the query construction wizard 20 and/or the end-user analytic report editor 22. Note that in the present example embodiment, the security setting is carried from the base template set up by an administrator to any end-user reports that are based on or derived using the base template. In this embodiment, end-user report creation does not modify the associated template security configuration. Alternatively, or in addition, authors of the transaction page code 18 may embed additional security code therein that is then read by the controller 12 during implementation and activation of one or more associated templates and/or reports that have been launched from the associated application page to which the added security code has been incorporated. These options facilitate further optimization and control over analytic template and associated report behaviors, thereby efficiently integrating and implementing the security features such that they are in conformance with an enterprise security policy.

When page fields are associated with an analytic template and/or associated analytic report by the page field association module 34, and templates and reports are associated with particular application pages by the template association module 32, this then enables the authorization service module 36 to run code for facilitating efficient implementation of the enterprise security policy. In the present example embodiment, the authorization service module 36 includes computer code for defining both user accessibility to analytic templates and associated reports (e.g., by specifying where and how the templates and/or reports will appear in application pages for particular end users), and which data may appear in a displayed template or report accessible to an end user. User role information, e.g., as provided via the permissions module 28, may further augment the security features implemented by the authorization service module 36.

The authorization service module 36 may further include computer code for defining user report and data accessibility and functionality based on context information, including user role, page context (e.g., as specified via one or more page fields), user entries provided in response to prompts provided via the wizards 20, 22, 52, and so on.

For the purposes of the present discussion, context information may be any information that may be employed to inform the system 10 as to which template or report types are to be accessible; and which data and/or functionality shall be provided in templates and/or reports. Accordingly, the context information discussed herein may include job role information, application page data (called page context herein), data collected from prompts, and so on.

Note that certain embodiments may leverage additional context information beyond user role and page context, e.g., implementations for use with mobile device clients may further incorporate device location information to filter or selectively adjust available analytic templates and reports and content and functionality accessible thereby in accordance with device location information.

Furthermore, note that in certain use cases, an end user may launch an analytic report from an application page that is different from a particular transaction page. For example, in certain cases, analytic reports may be selectively pinned to enterprise application landing pages or home pages, which may then appear as tiles or tabs therein. When an end user launches a report from a landing page, certain page context, which would otherwise be available when the report is launched from a transaction page, may be missing. In such cases, the resulting activated reports may initially not show data pertinent to a particular transaction, but may include or more links or other UI controls to facilitate navigation to any associated transaction pages.

In other cases, certain page context information may be automatically carried with the report template as it is pinned or positioned in various application pages, whether they are transaction pages or other types of application pages. Note that particular page context may be extracted and stored in the page context repository 50, and user role data and associated permissions may be stored in a user role data repository 48, where the repositories 48, 50 may be later selectively accessed by the controller 12 as needed in accordance with one or more instructions included with an analytic template or report.

The sample report publishing module 38 includes computer code enabling selective publishing of sample analytic reports, which an administrator may set up (i.e., develop or otherwise configure). The sample report publishing module 38 enables pushing of sample reports to end users, e.g. via a tile repository (that may include a collection of landing-page tiles or tabs selectively available to end users in accordance with the enterprise security policy) and/or application page(s). Accordingly, the published sample analytic reports may be accessed (in accordance with the enterprise security policy) by end users via the tile repository and/or from associated application pages to which the sample reports have been published. Note that the term "application pages" may also include transaction pages, landing pages, and so on.

Note that in the present example embodiment, templates need not be published as a separate step. In other words, associating a template to an application page (e.g., via the template association module 32) may automatically make the template selectively available for authorized end users via the associated application page. Sample reports may be "published" by an administrator, e.g., using the sample report publishing module 38, if the administrator wishes to create sample reports for end users.

In an example scenario, an administrator or developer employs the administrator client system 40 and associated UI display screens 44 to navigate to an enterprise application page that includes one or more user options (e.g., UI controls) for launching the administrator template constructor or wizard 20. Once launched, the administrator follows the on-screen guide to selectively configure an analytic template using one or more of the various modules 24-38, 48, 50, 52 that are accessible to the controller 12. The administrator may then save the configured analytic template, e.g., to the analytic report and template repository 30. Accordingly, a saved analytic template may be associated with an application page via template association module 32, such that it may be accessed by an end user by launching the report from an application page to which the template has been published.

Note that an end user can create a report based on one or more templates associated with a transaction page that the user is viewing. The following example use cases are illustrative:

Use Case 1:

Administrator:

a) An administrator creates one or more templates based on one or more queries/composite queries.

b) The administrator then associates the templates to application component via the template association module 32 (RCF configuration).

End User:

c) An end user navigates to the associated application page.

d) The end user can create a new report by choosing the associated template, and/or the end user can choose a template name from a list of available templates. Note that the template as such does not act like a report for displaying data, but instead the template carries metadata (e.g., configuration information) required to create a report.

Use Case 2:

a) After completing steps a, b, c in use case 1, the administrator may optionally navigate to the application page; create one or more sample reports just like an end user; and then publish the one or more sample reports, such that the published sample reports will be selectively accessible to (in accordance with the security policy) end users of the system via tiles (e.g., as may appear on a user's home page or other landing page) or via the application page.

b) The end user can use the administrator published report mentioned in step a as such, or save it as their own copy (or create their own report as explained in use case 1, steps c, d).

To edit a created report, an end user may employ the end user client system 42 to navigate to an application page that includes an option to launch the end user report editor or wizard 22. The end user may then employ the report editor 22 to further personalize (e.g., configure or edit) the layout or model defining the report by interacting with the editor 22. The end user report editor 22 selectively leverages the modules 24-38, 48, 50, 52 to enable end user report editing, configuration, saving, and publishing, while leveraging context information (including job role, i.e., user role data 48, and page context 50) to ensure compliance with the associated enterprise security policy.

In summary, one or more analytic templates (also called base templates) are created (e.g., by an administrator or developer) based on one or more query definitions. The base templates define the defaults or presets for criteria, report fields, report data dimensions, facts, visualization and pivot grid axis, and so on.

A created query and/or composite query definition is/are built on saved transaction tables 16 and incorporate user role data to control available software functionality and data access (as may be available through an analytic report based on the analytic template) via role-level query-based security.

Analytic templates under development are then associated with related transaction pages (e.g., leveraging a related content framework or engine). Then, the analytic templates are optionally associated with transaction page fields, e.g., by associating particular selected page fields with query criteria and/or prompts associated with the templates.

Furthermore, optionally, administrators define an authorization service to control what report templates and/or associated analytic reports are published; where they can be published; under what circumstances they can be published so that they are accessible to a given end user or collection of end users associated with a particular job role or other context information; and so on. Accordingly, functions of the authorization service may be determined by context information, e.g., page data, user roles, a combination thereof, and so on.

Accordingly, the system 10 represents an example computing environment and accompanying framework or architecture for end-user building of custom contextual real-time analytics while working on a transaction, whereby the customization facilitates informed decision-making.

Administrators build reusable composite queries and create pivot grid templates, which are then associated with one or more transactions. End users may pick and choose fields, filters, and create their reports. The end users may build visualizations, e.g., tables, charts, multi-dimensional pivot grids, and so on, on the fly, leveraging context information. The analytic reports may be pinned to a homepage or other landing page, and administrators or developers may inject custom logic that controls access to analytic report content that includes features for enabling creation and viewing administrator published analytic templates and/or end user published analytic reports that have been created using the analytic templates.

Figure 2:
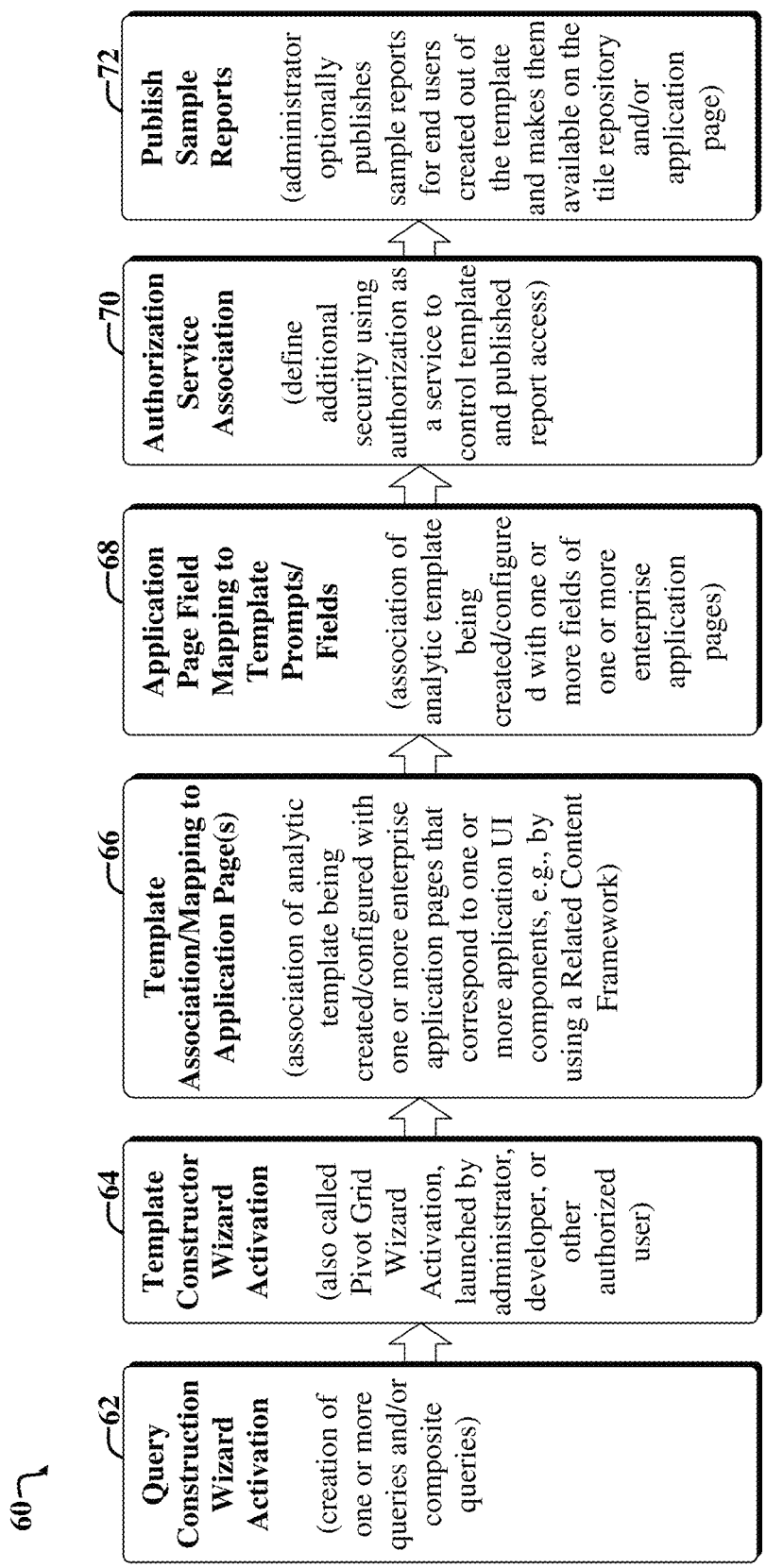
FIG. 2 illustrates a first example process flow that may be employed by an administrator or developer to construct an analytic template using the first example system of FIG. 1.

FIG. 2 illustrates a first example process flow 60 that may be employed by an administrator or developer (or other authorized user, e.g., "super user") to construct an analytic template using the first example system 10 of FIG. 1.

The example process flow 60 includes an initial wizard-activation step 62, which involves activation of a query construction wizard (e.g., the query construction wizard 20 of FIG. 1). The activated query construction wizard then includes software for guiding query construction.

Next, a template-construction step 64 is performed, whereby query/composite query created in step 62 is leveraged to build an analytic template, i.e., a base template. The base template contains reference(s) to query definition(s), the list of fields from the query that will be exposed to end user and the defaults for the report namely the list of dimensions, facts, aggregate functions, prompt value defaults, axis, filters, etc.

Note that in the present example embodiment, query construction occurs before template construction, as shown in FIG. 2, where the query construction wizard activation step 62 occurs before the template-construction step 64. Note, however, that in other alternative embodiments, a template-construction wizard may include an underlying query-construction wizard during a template-creation process, such that the query-construction software may be integrated with (or include) template-construction software.

Note that query construction step 62 involves creation of one or more queries and/or composite queries. The queries describe or specify how to populate data into analytic reports that are based on the template being constructed.

After an initial query and or composite query is set up for the template, a template association step 66 is performed, whereby the template under construction/configuration is associated with or otherwise mapped to one or more enterprise application pages, e.g., transaction pages. Note that one or more enterprise application components correspond to one or more application pages, i.e., UI display screens associated with or representing one or more respective UI components. The template association step 66 may involve leveraging a related content framework to facilitate implementing the associations.

Next, a page-field mapping step 68 includes associating or mapping application page fields to one or more prompts (e.g., fields or selectable options) to be included in the analytic template under construction. The application page fields correspond to fields and/or other data incorporated in an enterprise application page that corresponds to one or more application UI components. The enterprise application page represents a page from which a report to be later configured and/or used by an end use will be launched, e.g., via a representative UI control to be automatically published to or otherwise included in the application page.

Subsequently, an authorization-service association step 70 includes defining additional security using authorization as a service to selectively control template and published report access in accordance with the enterprise security policy.

Next, in an optional sample-report publishing step 72, an administrator optionally publishes sample reports for end users, the reports of which were created based on (or otherwise leveraging or using) the template. The published sample reports are made available via one or more user tile repositories and/or application pages. Note that the UI display screens used to create the sample report may be similar to the UI display screens available to end users to create his/her reports.

Hence, after page-field mapping, the sample report publishing step 72 involves selective publishing of the resulting created/configured sample reports (based on one or more underlying templates), thereby enabling context-based access to the sample analytic reports by authorized end users of the associated application page, report repository, and/or end-user tile repositories.

Figure 3:
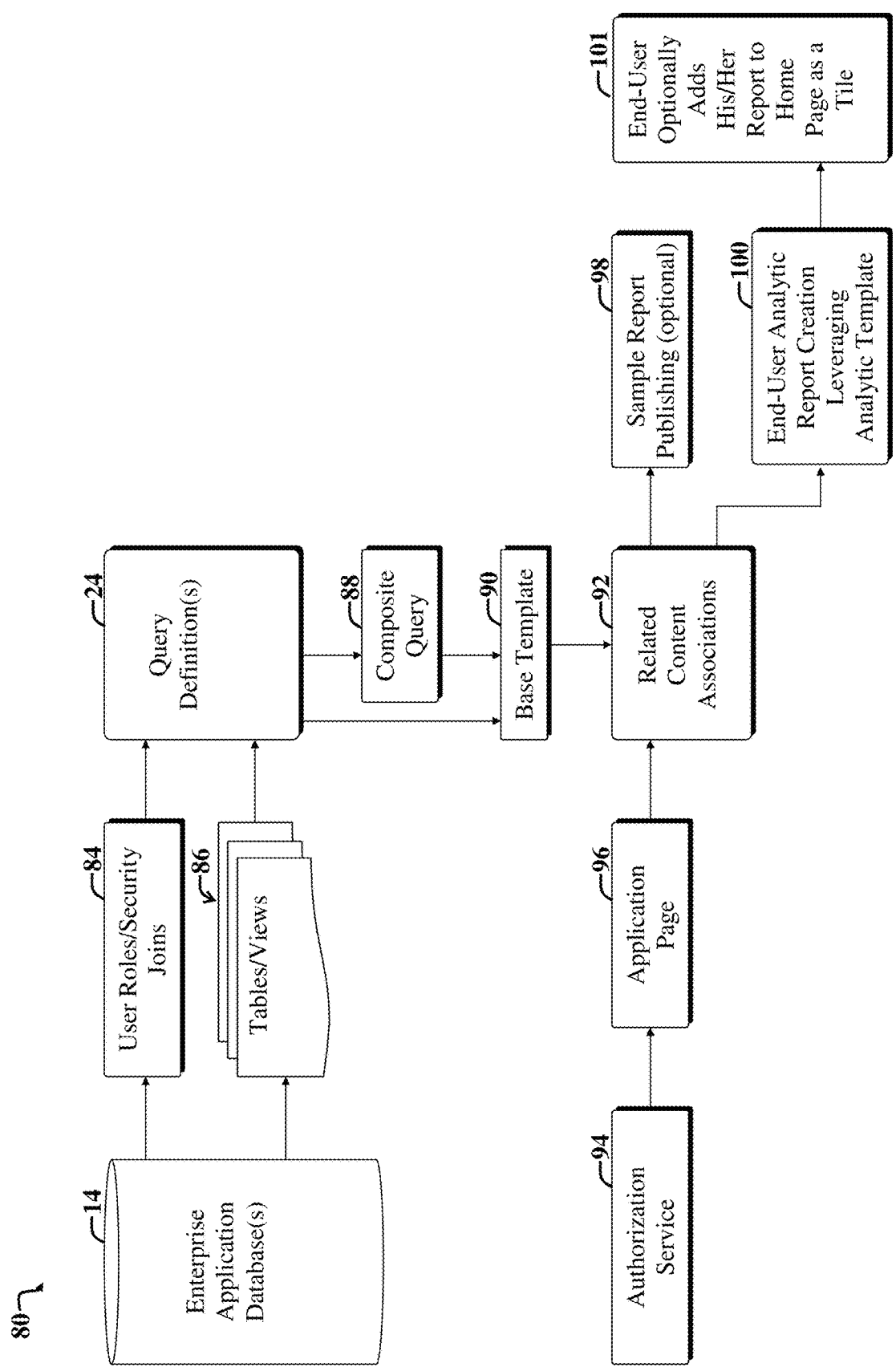
FIG. 3 illustrates a more detailed second example process flow that may be used to implement the first example process flow of FIG. 2.

FIG. 3 illustrates a more detailed second example process flow 80 that may be used to implement the first example process flow of FIG. 2. The second example process flow 80 shows user role information and associated security joins 84 being used to define table data and associated views to be incorporated as part of one or more query definitions 24. The one or more query definitions 24 may be packaged as a composite query 88 and incorporated into a specification of the analytic template, i.e., base template 90.

One or more base templates 90 are then associated with related content 92, thereby associating the one or more templates with the application page 96. The application page could be associated with an authorization service definition 94 which could control the end-user access to the template and published reports.

The resulting associated base template may optionally be used by an administrator to create and publish sample analytic reports, in an optional sample-report publishing step 98.

The resulting base template may be further leveraged during an end-user report creation step 100 to generate reports that use or leverage the templates and associated one or more queries/composite queries defined via the template. Accordingly, during the end-user report creation step 100, end users may leverage the template and use it and a corresponding wizard (e.g., the end user report editor 22 of FIG. 1) to create personalized analytic reports, which then may be used/activated, and optionally shared with other end users. Note that after the end-user report creation step 100, at step 101, the end user may optionally add his/her created report to their home page or other landing page as a tile, tab, or other UI control or feature.

Figure 4:
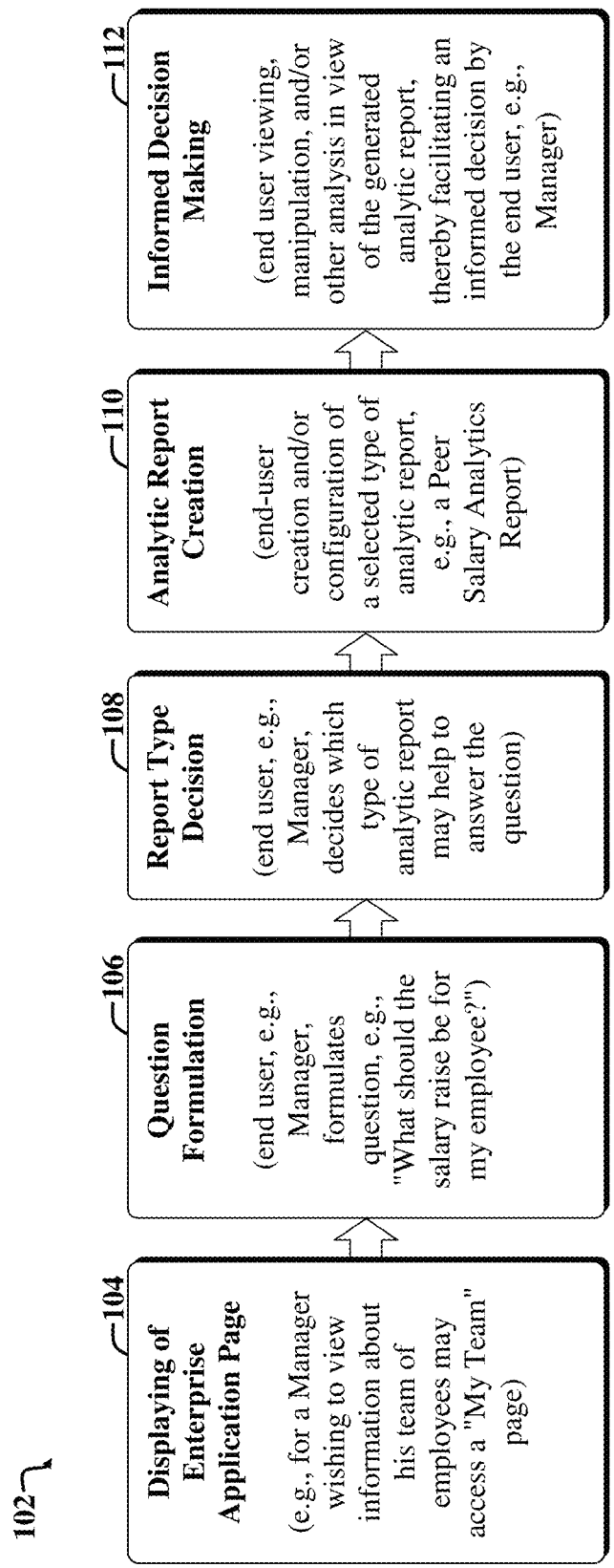
FIG. 4 illustrates a third example process flow that may be employed by an end user to construct an analytic report based on an analytic template constructed in accordance with the embodiments of FIGS. 1-3.

FIG. 4 illustrates a third example process flow 102 that may be employed by an end user to construct an analytic report based on an analytic template constructed in accordance with the embodiments of FIGS. 1-3.

The third example process flow 102 includes an initial page-displaying step 104. The initial page-displaying step 104 may involve a user, e.g., a manager or other enterprise personnel, employing a client device and accompanying browser to navigate to a desired enterprise application page. For example, a manager wishing to view information about his team of employees may access a "My Team" page or component.

Subsequently, in view of the application page, the end user formulates a question 106. For example, the manager may ask himself/herself what salary raise should be given to a particular subordinate employee.

To answer the question, the end user then decides what type of analytic report may be useful, e.g., in a report-type decision step 108. For example, the end user, e.g., manager, may decide that a salary analytics report may be useful.

Next, in a report-creation step 110, the end user proceeds to create an analytic report of the selected type by choosing the corresponding template for salary analytics made available by the administrator. For example, the end user may create a Peer Salary Analytics Report.

The resulting analytic report may contain insightful information (and accompanying illustrative pivot grids, charts, and/or other visualizations) needed for informed decision-making 112. During interaction with the analytic report, the end user may launch an editor or wizard to facilitate further customizing the analytic report, i.e., if needed, and if the end user is authorized to configure the analytic report.

Figure 5:
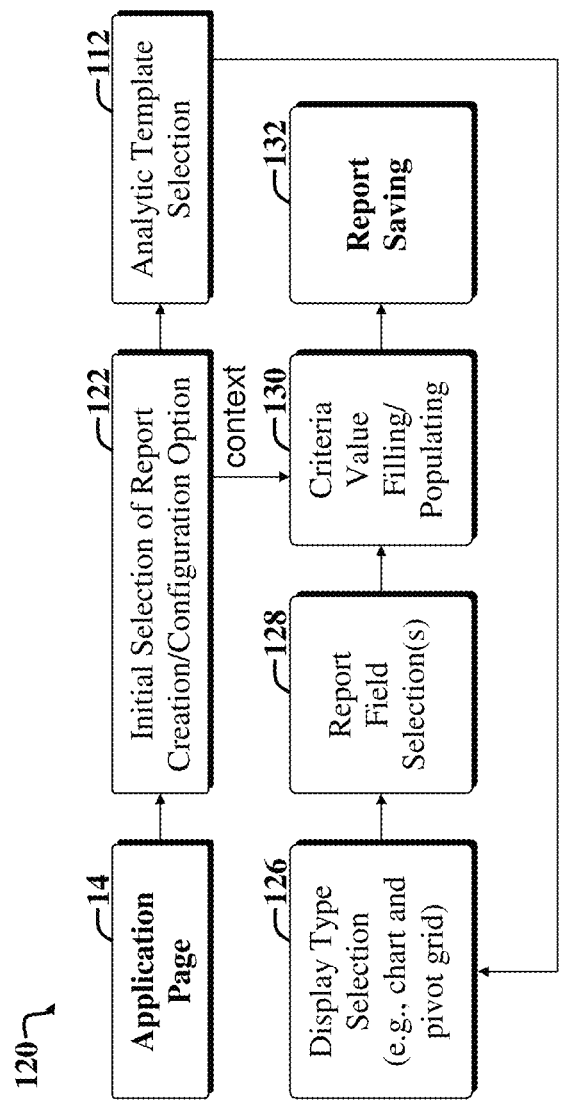
FIG. 5 illustrates a more detailed fourth example process flow that may be employed to implement the third example process flow of FIG. 4.

FIG. 5 illustrates a more detailed fourth example process flow 120 that may be employed in combination with the third example process flow 102 of FIG. 4.

The fourth example process flow 120 involves displaying of an application page 14, which may show a listing of available analytic reports and/or templates published for use by that application page.

Next, a report-selection step 122 involves the end user selecting an option to create or configure an analytic report, starting with selected base template 112. Note that context information captured from the application page and associated report-selection step 122 may be passed to subsequent steps, e.g., a criteria step 130, as discussed more fully below.

After a base template is selected, a display-type selection step 126 involves the end user selecting (e.g., in response to a prompt provided by the end user report editor or wizard 22 of FIG. 1) from available display options (to be included in the end-user analytic report), e.g., options to show a chart, pivot grid, and/or other visualizations in a corresponding displayed analytic report.

Next, a field-selection step 128 involves the end user employing the associated report-creation wizard (e.g., corresponding to the end user report editor 22 of FIG. 1) to select one or more fields to be included in the analytic report.

Subsequently, a criteria-determination step 130 involves determining query parameters or criteria based on the report field selections and page context information. The criteria is used to define queries that will be run to populate analytic reports with data selectively retrieved from a database, such as the networked multitenant enterprise database(s) 14 of FIG. 1.

For the purposes of the present discussion, a networked multitenant database may be any database that is accessible by plural clients and/or software systems, where the clients refer to tenants that are served by the database via network connections thereto.

The report may then be saved after previewing, e.g., in a report saving step 132 and/or activated or run. When an analytic report is activated or run, underlying queries (that are defined as part of the analytic report and/or template from which the analytic report is derived) are executed against the live, i.e., running database, such that data used to populate the analytic report represents current or "live" data, also called real time data herein.

Figure 6:
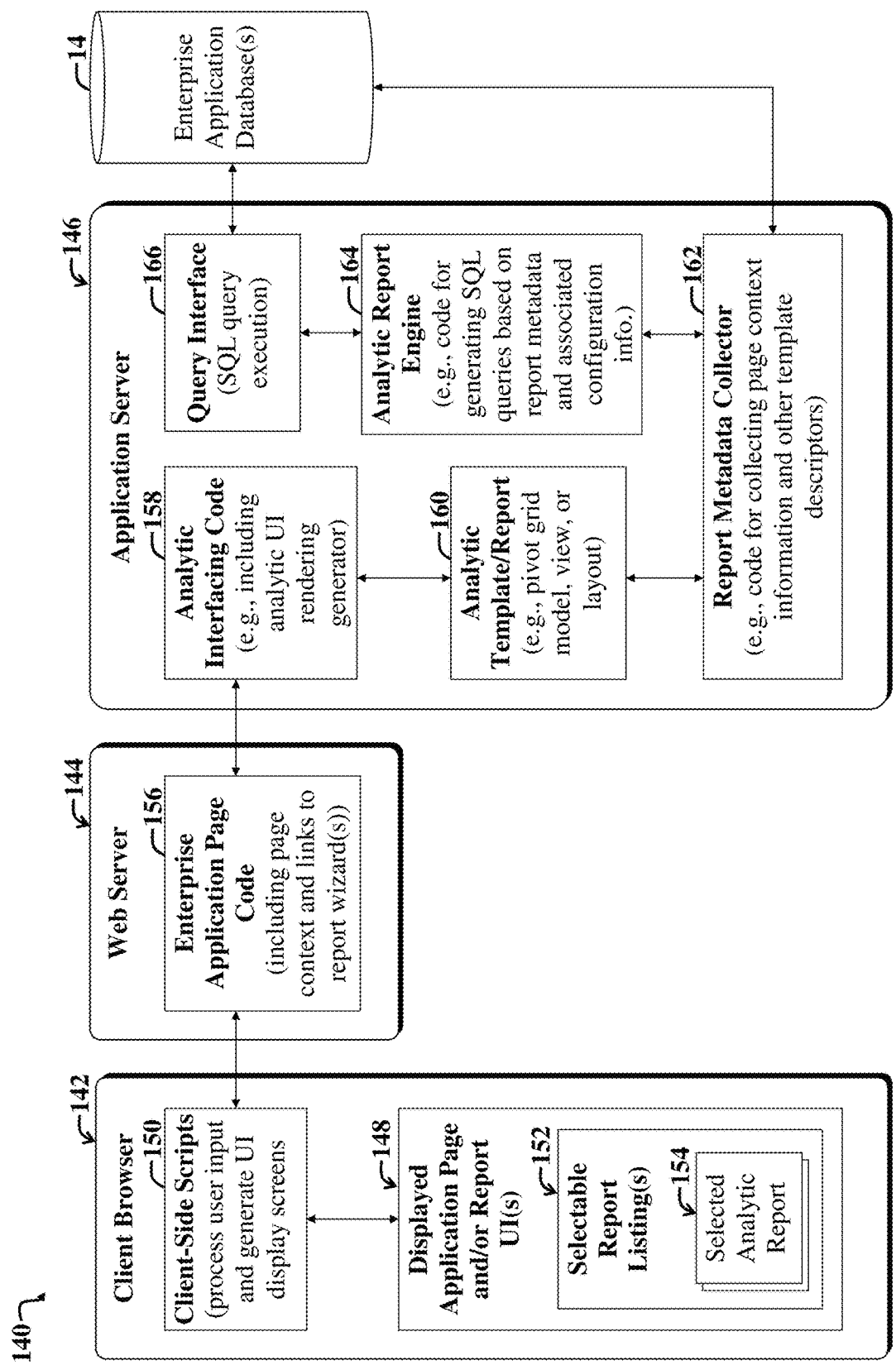
FIG. 6 illustrates a second example system that is consistent with the first example system of FIG. 1, but which illustrates additional detail pertaining to a client-server architecture usable to implement the embodiments of FIGS. 4-5.

FIG. 6 illustrates a second example system 140 that is consistent with the first example system 10 of FIG. 1, but which illustrates additional detail pertaining to a client-server architecture usable to implement the embodiments of FIGS. 4-5.

The second example system 140 shows a client browser 142 of a client system in communication with a Web server 144 via a network, such as the Internet. The Web server 144 communicates with an application server 146, which further communicates with one or more back end databases 14, e.g., enterprise application databases.

The client browser 142 and/or accompanying client device includes or leverages client-side scripts 150 to communicate with enterprise application page code 156 running on the Web server 144.

The browser 142 also provides one or more UI display screens 148, which are usable to show selectable analytic reports 152, enabling user selection of a selected analytic report 154. The selectable report listing 152 may be generated using rendering code incorporated as part of the enterprise application page code 156. The enterprise application page code 156 may incorporate links to functionality provided by one or more analytic template or report generation wizards (e.g., corresponding to the modules 20, 22 of FIG. 1).

The enterprise application page code 156 facilitates interfacing the client browser 142 with functionality provided by the application server 146. The example application server 146 includes an analytic interfacing module 158 in communication with the enterprise application page code 156 running on the Web server 144.

The analytic interfacing module 158 facilitates interfacing the enterprise application page code 156 with other modules 160-166 of the application server 146. The other modules 160-166 include an analytic template module 160, which corresponds to a UI model for an analytic template and/or report to be run, i.e., activated.

The analytic template module 160 communicates with a report metadata collector 162, which includes code for collecting page context information and other template descriptors to be used by the analytic template 160 and associated queries.

An analytic report engine 164 communicates with the report metadata collector 162 and includes code for generating queries, e.g., SQL queries, based on the report metadata and associated configuration information defining the analytic template and/or report.

The analytic report engine 164 further communicates with a query interface 166 to the database(s) 14, and includes instructions for selectively executing the queries generated by the analytic report engine 164. Execution of the queries includes retrieving current data from the database(s) 14 in accordance with the query definitions set forth via the analytic report engine 164, as derived from the analytic template 160.

Note that the report metadata collector 162 may also communicate more directly with the database(s), e.g., so as to facilitate acquiring additional context information that may be available from the database(s) 14. Alternatively, the report metadata collector 162 leverages the analytic report engine 164 and query interface 166 to extract context information as needed from the database(s) 14.

Figure 7:
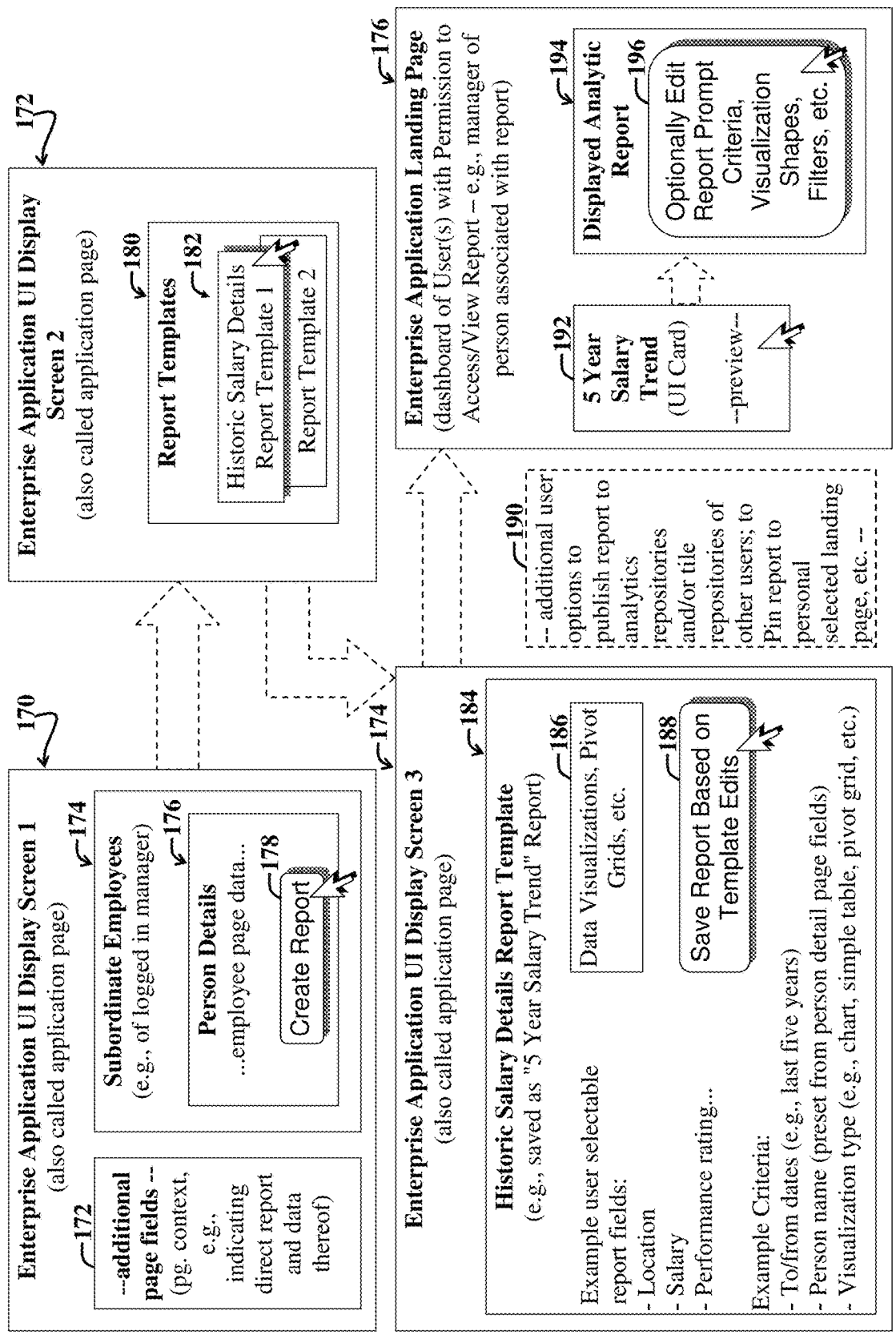
FIG. 7 illustrates an example sequence of basic UI display screens that may be used when executing the end-user analytic report creation process flows of FIGS. 4-6.

FIG. 7 illustrates an example sequence of basic UI display screens 170-176 that may be used when executing the end-user analytic report creation process flows of FIGS. 4-6. The UI display screens 170-176 may be rendered in a browser of the end user clients systems 42 of FIG. 1, and may be included among the client UI display screens 46 of the end user client systems 42 of FIG. 1.

The example UI display screens 170 include an initial application page 170, which includes various page fields 172 that may provide context usable by an analytic report that may be activated or otherwise created or launched from the initial example application page 170. The initial application page 170 further shows a particular example view 174 that illustrates data for subordinate employees of the current logged in user.

Within the example view 174, the end user may have drilled down to illustrate details 176 for a particular employee. The employee details 176 may also include page data that may be usable as page context for any reports created from or launched from the application page 170.

In the present example embodiment, a user selects an option 178 to create an analytic report. This then activates display of a second example UI display screen 172, which includes of a listing 180 of any available report templates 182.

The user then selects a report type from among the listed templates 182. This results in display of a third UI display screen 174 after any user configurations applied thereto. Example configurations include adding and removing filters from displayed visualizations 186; selection of visualization types; adjustments to any pivot grids, and so on. The configuration may then be saved as an analytic report, e.g., in response to user selection of a save button 188.

After the report is saved and optionally published 190 and pinned to an end user landing page or landing page repository, it may then be activated, e.g., displayed (and incorporating analytic report data retrieved from a database) in a fourth example UI display screen 176. The activated report 192 may appear, for example, as a "5 Year Salary Trend" UI card of a landing page; as an option appearing in a transaction page, and/or in other locations.

End users may then employ one or more UI controls that point to the published analytic report to trigger activation and display of the associated analytic report 194. The displayed analytic report may include one or more visualizations (e.g., charts), pivot grids, and so on, as specified in the underlying analytic report, i.e., layout. The displayed analytic report 194 will include charts that have been generated based on current data that has been retrieved from the underlying database(s) via the one or more queries that form part of the definition or description of the associated analytic report.

Note that after saving an analytic report using the third UI display screen 174, a user may instead (i.e., instead of option to publish the associated report to one or more landing pages) publish report to one or more application pages that may be accessible to other authorized users. In addition, or alternatively, the report may be published to a repository of report tiles. Analytic reports in the repository may be browsable and selectable by other authorized users, e.g., end users.

Users may select the reports and then further configure or otherwise customize selected templates or reports as needed; then optionally publish the resulting customized reports. The customized reports may be used as templates by other authorized end users, who may wish to perform their own customizations.

Templates or reports appearing in a selectable list of templates or reports may be filtered in accordance with user role information of the user accessing the selectable list, and may be further filtered in accordance with page context information. The page context information may include data derivable from one or more fields of an application page from which the selectable list (derived from the repository) is accessed.

Similarly, users may be provided with additional options 190, including options to publish reports to tile repositories of other authorized (in accordance with an enterprise security policy) end users. Tile repositories include a collection of one or more reports that may be pinned to end user landing pages (e.g., home pages).

Figure 8:
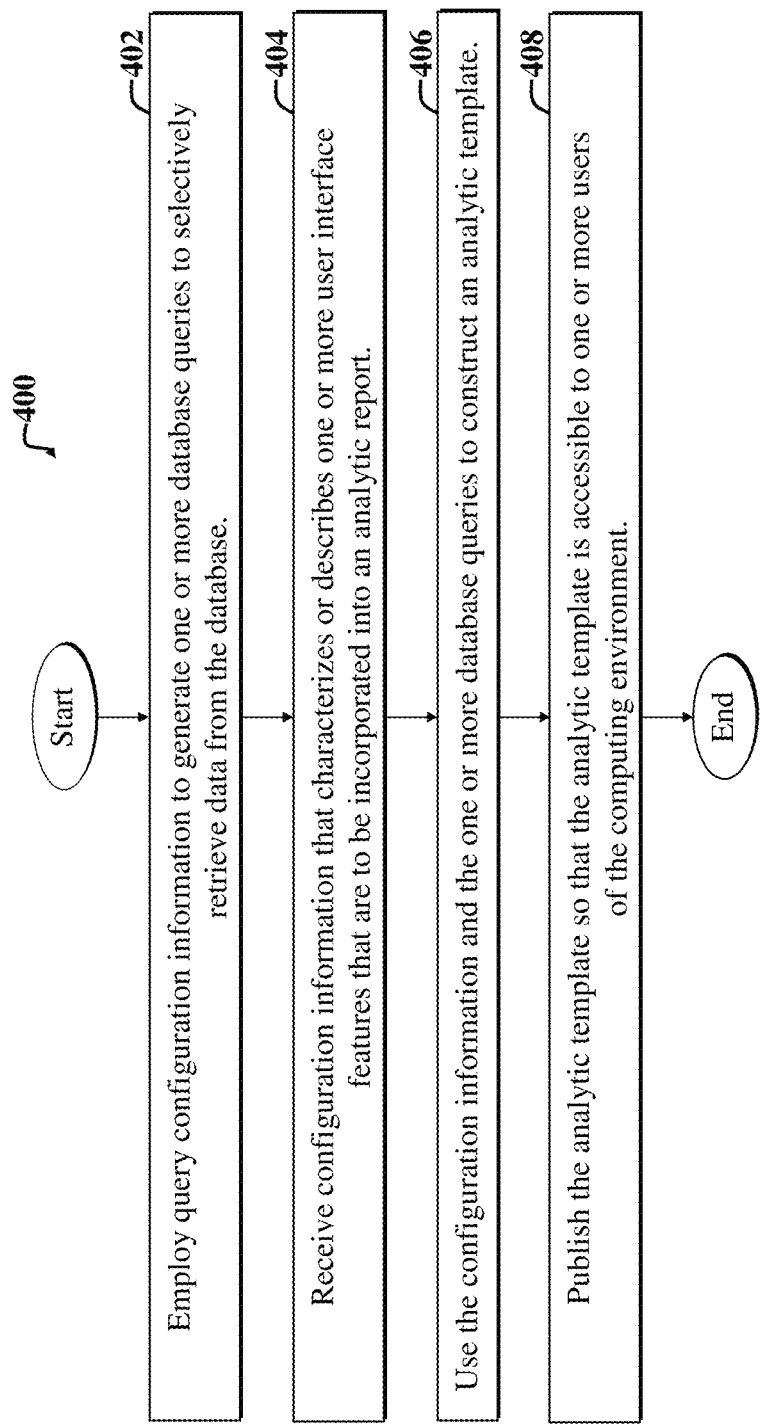
FIG. 8 is a flow diagram of a first example method suitable for use with the embodiments of FIGS. 1-7 and usable to facilitate construction of an analytic report template.

FIG. 8 is a flow diagram of a first example method 400 suitable for use with the embodiments of FIGS. 1-7 and usable to facilitate construction of an analytic report template. The example method 400 facilitates construction or configuration of a reusable analytic template based on queries, which are used to selectively populate UI features of an analytic report with data, wherein the analytic report is based on or otherwise derived using analytic template.

The first example method 400 includes an initial configuration-employing step 402, which involves employing configuration information (e.g., as may be provided via the query construction wizard 20 of FIG. 1) to generate one or more database queries to selectively retrieve data from the database in accordance with parameters and information defining an analytic template.

Next, an information-retrieving step 402 includes receiving configuration information characterizing one or more UI features to be incorporated into an analytic report. The configuration information may be derived through user interaction with one or more software wizards used to define or specify properties of the analytic report and/or underlying analytic template. Note that an analytic template is also a type of analytic report, and in certain embodiments and use cases, may be used as an end-user analytic report without any end user configuration or personalization required.

Next, a template-construction step 406 includes using the configuration information (including the configuration information characterizing the one or more UI features) and the one or more database queries to construct an analytic template.

Finally, the analytic template is optionally selectively published so that the analytic template is accessible to one or more users of the accompanying computing environment.

Note that the method 400 may be altered, without departing from the scope of the present teachings. For example, additional steps may be added; other steps may be removed; certain steps may be interchanged (i.e., steps may be reordered), or additional details may be added.

For example, the method 400 may further specify that the computing environment includes an enterprise-computing environment, and the one or more users include enterprise personnel. The configuration information may include instructions for collecting context information to control user accessibility to the analytic template in accordance with the context information, which may include user role (e.g., job role) information.

The configuration information may further include one or more security settings specifying which of the enterprise personnel using the computing environment may access the analytic template in accordance with the user role information pertaining to the enterprise personnel. The configuration information may further include a first security setting specifying which of the one or more database queries of the analytic template will retrieve data for use by the enterprise personnel in accordance with user role information pertaining to the enterprise personnel. The configuration information may further include instructions for obtaining additional context information pertaining to one or more UI display screens and data associated therewith. The data may pertain to one or more enterprise transactions that are respectively associated with the one or more UI display screens.

The one or more UI display screens may represent one or more enterprise application pages of an enterprise application UI component. The additional context information may include data that is available in one or more fields of the one or more UI display screens. The additional context information may further include data that is retrieved from one or more user entries responsive to one or more user prompts, where the one or more user prompts are displayed during configuration of one or more of the analytic report template and/or the analytic report based on the analytic report template.

The configuration information may further include information that associates the one or more enterprise application pages with the analytic template, such that when published, the analytic template will be accessible to one or more end users of the computing environment via the one or more enterprise application pages.

In a specific embodiment, the first example method 400 may further include providing one or more UI controls in the one or more enterprise application pages, wherein the one or more UI controls facilitate enabling one or more enterprise personnel to use the analytic template to construct an end-user analytic report. The one or more UI controls may include a template-access control (e.g., one of the controls 182 of FIG. 7).

The publishing step 408 of the first example method 400 may further include providing the template-access control in the enterprise application page, wherein the template-access control enables activation of software for facilitating user editing the analytic template to yield the end-user analytic report. The software may include an analytic report construction wizard for guiding an end user during editing of the analytic template to facilitate construction of the analytic report.

The analytic template may represent a UI model that is described by one or more default settings for an analytic report to be constructed by a user based on the analytic template. The one or more default settings characterize a layout of an initial analytic report to be populated with data from the database using the one or more database queries, when an analytic report based on the analytic template is constructed by an end user and then activated in response to user selection of a control to access the analytic report.

The one or more database queries may include a composite query comprising plural database queries. The composite query includes or incorporates access criteria specifying role-level security in accordance with user role information. The plural database queries may include one or more Structured Query Language (SQL) queries.

The method 400 may further include automatically generating the one or more SQL queries of an analytic report that is based on the analytic template in response to a user accessing the analytic report. The one or more SQL queries may be used to retrieve data for the analytic report from a running enterprise database (e.g., the database(s) 14 of FIG. 1) in accordance with report configuration information, the report configuration information representing a description of the UI model. The report configuration information may further represent a user-modified version of the configuration information characterizing the analytic template.

The description of the UI model may include an indication that an accessed version of the analytic report will include a combination of a pivot grid, a data visualization, and one or more filters that are selectable by an end user to manipulate retrieved data displayed via the pivot grid and data visualization. The retrieved data represents data that is retrieved for the analytic report from the running enterprise database.

In summary, the first example method 400 represents a method for facilitating configuring an analytic report template, which includes setting up how the associated analytic report will appear when displayed, e.g., which visualizations, pivot grids, tables, filters, and so on, will be included in analytic templated.

Note that displayed data slices to be presented in an analytic template and/or associated analytic report will be formatted in accordance with the analytic template or report and may be descriptive of a transaction that the end user was viewing when the template or report was activated for displaying retrieved content. Any displayed template or report may include data slices that vary based on related content that has been filled in via other interfaces or particular input fields/questions that give context to the transaction and/or are based on a particular user and role of the user who has specified the content.

Note that additional options, such as for enabling administrators, developers, or end users to create custom code, in addition to custom code automatically generated using one or more report-creation wizards. The custom code may be integrated with code generated by wizards and used to define analytic reports and/or associated templates. The custom code may, for instance, specify additional security mechanisms for further controlling where and how different reports appear in different application pages; what data will be accessible via the templates and/or reports; and what functionality that will be incorporated into the reports and/or templates when activated (i.e., displayed), and who, i.e., which user, has access to which template/report.

Note that the method 400 may further include use of a UI to facilitate end user viewing of analytic templates and/or reports depending upon their job role and/or other additional context. The additional context may incorporate or be leveraged by custom code (which may be hand coded and/or automatically generated via one or more wizards) that governs which user can create and/or view which type of report and which set of data should be shown for which type of report and which user role.

Note that, for example, a junior manager that elects to see a sales analytic report may see different options and even different parts of a data set; not just a data superset/subset, than a senior manager may see. Note that conventionally, data shown in enterprise reports for a particular user is often a superset or subset of data depending upon where the user is a superior or subordinate employee of another.

Figure 9:
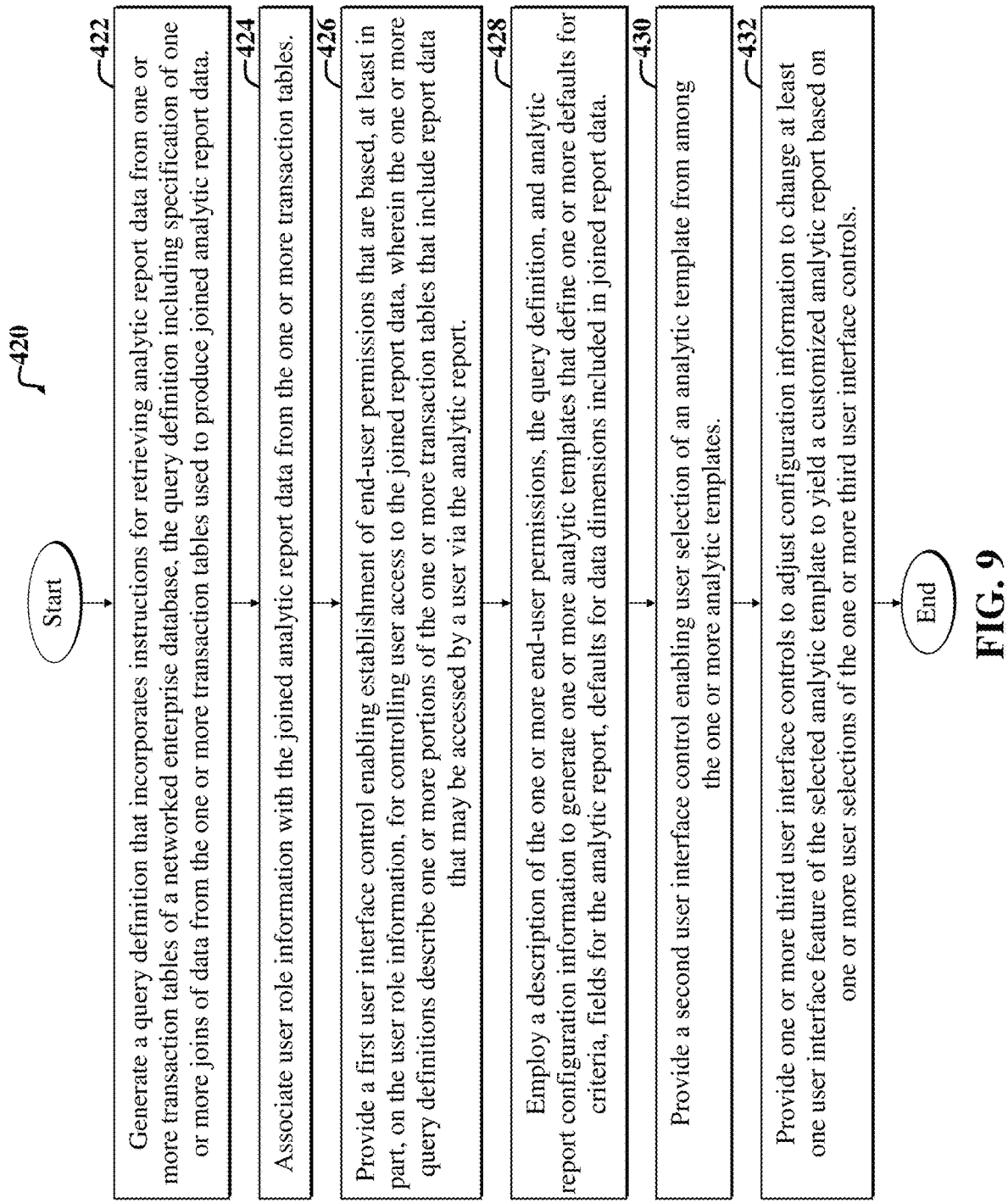
FIG. 9 is a flow diagram of a second example method suitable for use with the embodiments of FIGS. 1-8 and usable to facilitate construction of an analytic report template.

FIG. 9 is a flow diagram of a second example method 420 suitable for use with the embodiments of FIGS. 1-8 and usable to facilitate construction of an analytic report template. The example method 420 facilitates configuration of a customizable reusable report template for facilitating end user creation of an analytic report based on the report template.

The second example method 420 includes an initial query-definition step 422, which includes generating a query definition with instructions for retrieving analytic report data from one or more transaction tables, the query definition including specification of one or more joins of data from the one or more transaction tables used to produce joined analytic report data.

Next, a data-joining step 424 includes associating user role information with the joined analytic report data from the one or more transaction tables.

Subsequently, a first configuration step 426 includes providing a first UI control enabling establishment of end user permissions (based on the user role information) for accessing the joined report data. The one or more query definitions describe one or more portions of the one or more transaction tables that may be accessed by a user via the analytic report as the report data.

Next, a second configuration step 428 includes employing a description of the one or more end user permissions; the query definition; and analytic report configuration information to generate one or more analytic templates that define one or more defaults for criteria, fields for the analytic report, and defaults for data dimensions included in joined report data.

A report-selection-option step 430 then involves displaying a second UI control enabling user selection of an analytic template from among the one or more analytic templates, resulting in a selected analytic template in response to user selection of the second UI control.

Next, a configuration-option providing step 432 includes providing one or more third UI controls to adjust configuration information to change at least one UI feature of the selected analytic template to yield a customized analytic report based on one or more user selections of the one or more third UI controls.

Note that the second example method 420 may be modified, without departing from the scope of the present teachings. For example, the second example method 420 may further include associating a first set of one or more fields of a first UI display screen with the selected analytic template.

The first UI display screen may display data pertaining to a transaction associated with a transaction that is associated with the one or more transaction tables. The UI display screen is associated with the selected analytic report template. The UI display screen may be or may include an enterprise application page.

The second example method 420 may further include associating a second set of one or more fields of the enterprise application page with one or more criterion specified by user input responsive to one or more prompts associated with the analytic template.

The step of associating a second set of one or more fields may further includes: providing one or more fourth UI controls enabling user selection of a display option pertaining to displaying the customized analytic report; accepting a signal from a user input device to modify at least one UI feature of the analytic template; and selectively displaying the customized analytic report so that when the modified interface feature is used, the customized analytic report (including any charts, pivot tables, simple tables, and/or combinations thereof) associated with the UI feature is generated for the joined analytic report data in accordance with user configurable information characterizing the customized analytic template.

The second example method 420 may further include providing one or more fourth UI controls enabling an analytic report developer to define an authorization service to control whether or not the analytic template may be accessible to another user and under which circumstance, wherein the circumstance is defined by context information.

The second example method 420 may further include employing data associated with the enterprise application page to facilitate determining whether or not the analytic template shall be accessible to a given user of the analytic template and the customized analytic report based on the analytic template. The user role information (that is associated with a user of the customized analytic report) may be used to determine what data to retrieve from the one or more transaction tables and made available to an end user of the customized analytic report via the customized analytic report.

The second example method 420 may further include providing one or more fifth user options to publish the customized analytic report, so that the customized analytic report is available to one or more authorized users of enterprise software used to display data associated with or included in the one or more transaction tables.

The UI feature may include, for example, an input field as specified via a parameter set in a related content configuration. Examples of the user input field includes one or more of date range, buyer name, category, item name, manufacturer, currency.

The second example method may further include accepting a signal from a user input device to define a security option for a report. User selection of the security option enables the analytic report to be accessed outside of the first UI display screen (e.g., accessed via a landing page or home page). User selection of the security option enables pinning of the analytic report to a landing page of a user.

Figure 10:
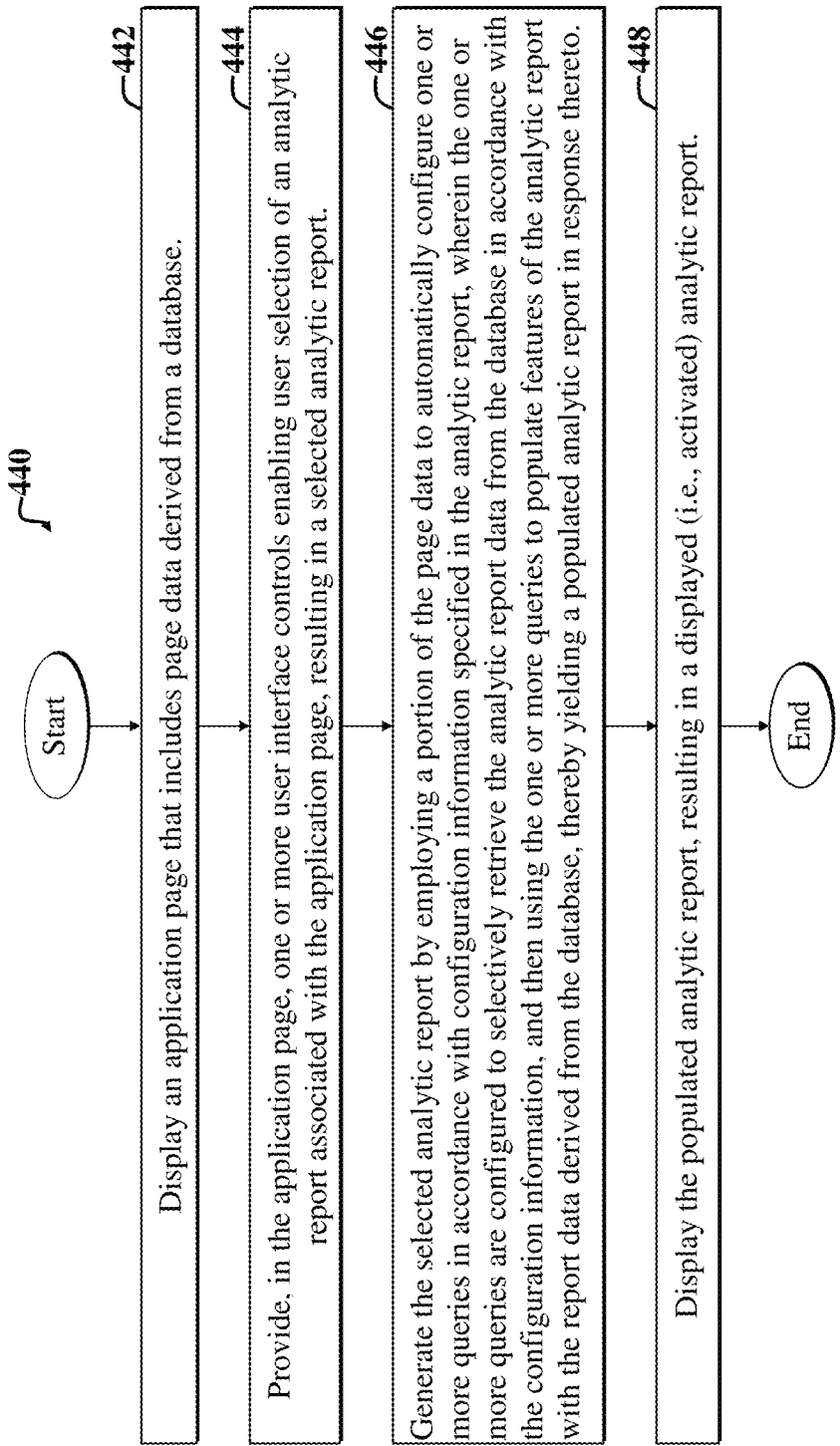
FIG. 10 is a flow diagram of a third example method suitable for use with the embodiments of FIGS. 1-9 and usable to facilitate end user construction of an analytic report starting from a selected analytic report template.

FIG. 10 is a flow diagram of a third example method 460 suitable for use with the embodiments of FIGS. 1-9 and usable to facilitate end user construction of an analytic report starting from a selected analytic report template. The third example method 460 facilitates use of a configurable analytic report, including construction and activation of the analytic report based on a pre-configured analytic template, which itself is a type of analytic report.

After a UI display screen illustrating page data derived from a database is displayed in an initial displaying step 442, the third example method 440 includes an option-providing step 444.

The option-providing step 444 includes providing, in the UI display screen, one or more UI controls enabling user selection of an analytic report associated with the UI display screen, and providing a signal in response to user selection of the one or more UI controls, the signal indicating a selected analytic report.

Next, a report-generating step 446 includes generating an analytic report, in response to the signal, wherein generating further includes: employing a portion of the page data to automatically generate one or more queries in accordance with configuration information specified in the analytic report, the one or more queries configured to selectively retrieve the analytic report data from the database in accordance with the configuration information; and using the one or more queries to populate one or more features of the analytic report with the report data derived from the database, yielding a populated analytic report in response thereto.

Another displaying step 448 includes displaying the populated analytic report, resulting in a displayed (i.e., activated) analytic report.

Note that the third example method 440 may be modified, without departing from the scope of the present teachings. For example, the method 440 may further specify that the page data derived from the database includes data pertaining to an enterprise application transaction, and wherein the UI display screen represents an enterprise application page associated with the enterprise application transaction.

The third example method 440 may further include using context information to determine the one or more UI controls to display in the enterprise application page, the context information including user role information.

The third example method 440 may further include obtaining the report data from the database in accordance with the context information, and further in accordance with one or more fields of the analytic report. The method 440 may further include incorporating the context information into the one or more queries to determine which report data to retrieve from the database in accordance with a security policy associated with the analytic report. The context information may further include one or more portions of the page data.

The third example method 440 may further include employing computer code associated with the report to determine which set of report data should accessible to each user via the analytic report, based on user role information and one or more rules specified by the computer code, the computer code facilitating implementation of the security policy.

The computer code may be customizable, e.g., in response to user interaction with an analytic report editor (e.g., software wizard) usable to configure the analytic report. The method 440 may further include providing one or more UI controls enabling a user to edit configuration information associated with an analytic template to generate the analytic report, and one or more additional UI controls for enabling activation of the analytic report.

The third example method 440 may further specify that the one or more features, i.e., user interface features of the analytic report include a pivot grid and/or other visualization, e.g., a chart. For the purposes of the present discussion, a user interface feature may be any characteristic of a UI display screen, including, but not limited to visualization(s) displayed therein, sub-window(s), UI controls (e.g., tabs, links, buttons, drop-down lists, fields, check boxes, other types of prompts, and so on), tables, displayed data, and so on. Note that a UI feature may also include software functionality associated with the UI display screen, i.e., the term "UI feature" is not limited to viewable elements or aspects of a UI display screen, but may further include characteristics or configuration information defining a UI framework or model used to construct the UI display screen, as well as database objects to which queries associated with a UI display screen refer.

The analytic report may include a first UI control for enabling initiating of a software action related to the report data. The software action may include, for example, displaying supplier information when the analytic report represents an enterprise expense report. The report data includes current data in the database at the time of execution of the one or more queries, wherein the database represents a running cloud-based (or other network-based) multitenant database.

The one or more queries may include one or more composite SQL queries, wherein the one or more SQL queries are automatically generated by an analytic report engine (e.g., the report engine 164 of FIG. 6) based on configuration information associated with the analytic report, and automatically executed by a query interface (e.g., interface 166 of FIG. 6) running on an application server and in communication with the database.

The analytic report may further include a UI control enabling pivoting of report data in a displayed pivot table or chart. The analytic report may further include a UI control for enabling pinning of the analytic report to a homepage, resulting in a pinned analytic report. The third example method 440 may further include displaying a representation of the pinned analytic report in the home page via one or more UI tiles of the homepage.

Figure 11:
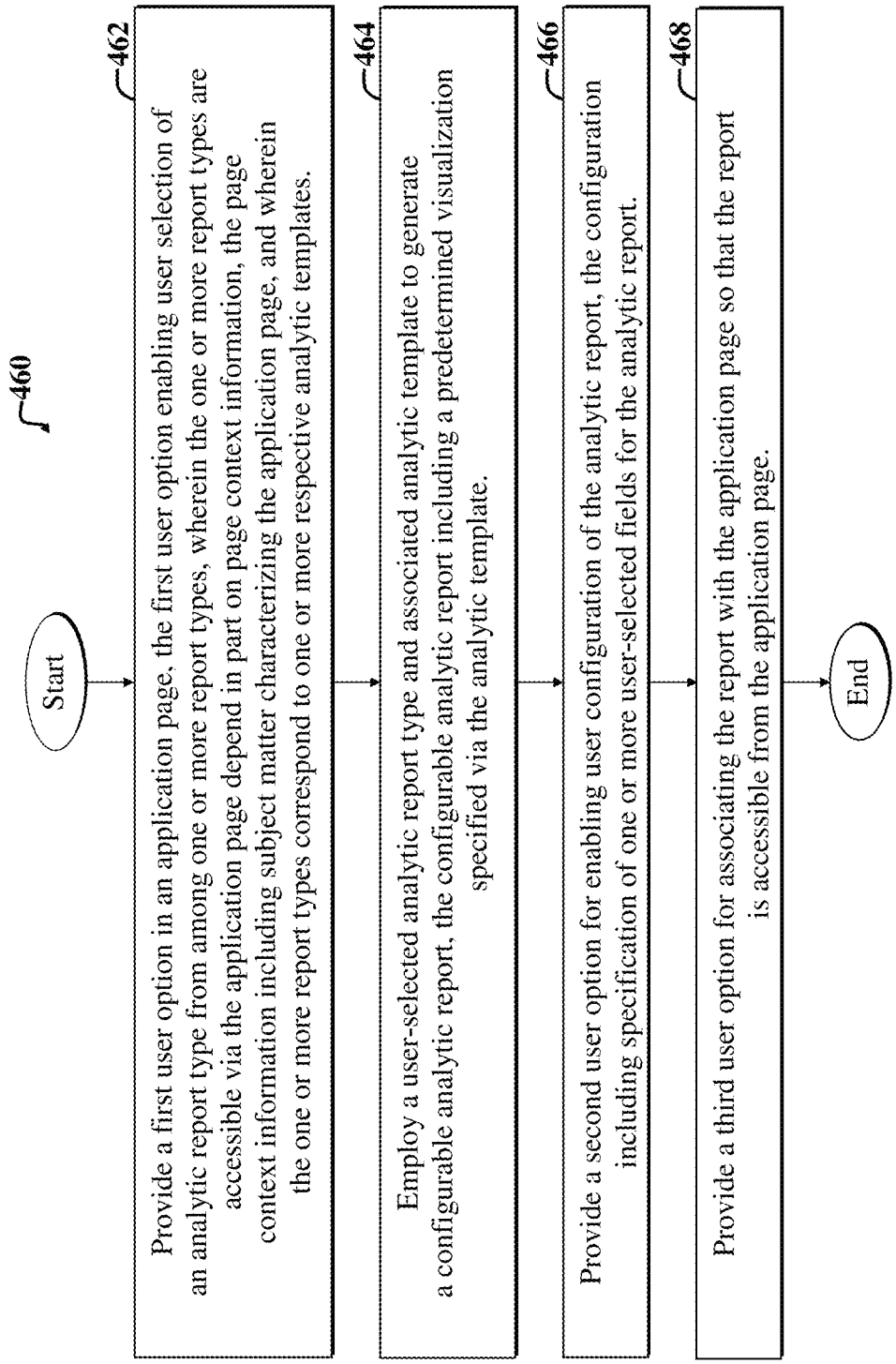
FIG. 11 is a flow diagram of a fourth example method suitable for use with the embodiments of FIGS. 1-10 and usable to facilitate end user construction of an analytic report starting from a selected analytic report template.

FIG. 11 is a flow diagram of a fourth example method 460 suitable for use with the embodiments of FIGS. 1-10 and usable to facilitate end user construction of an analytic report starting from a selected analytic report template. The fourth example method 460 facilitates generating an analytic report by an end user that has access to a corresponding analytic template.

The fourth example method 460 includes a first step 462, which includes providing one or more first UI controls in an application page, the one or more UI controls enabling user selection of an analytic report type from among one or more report types, wherein the one or more report types accessible via the application page depend in part on page context information, the page context information including subject matter characterizing the application page, and wherein the one or more report types correspond to one or more respective analytic templates.

A second step 464 includes employing a user-selected analytic report type and associated analytic template to generate a configurable analytic report, the configurable analytic report including a predetermined visualization specified via the analytic template.

A third step 466 includes providing one or more second UI controls enabling user configuration of the analytic report, the configuration including specification of one or more user-selected fields for the analytic report.

A fourth step 468 includes providing a third user option, e.g., via one or more third UI controls, to associate the report with the application page so that the report is accessible from the application page by other authorized end users.

The fourth example method 460 may be modified, without departing from the scope of the present teachings. For example, the method 460 may further include displaying a UI control enabling saving of the analytic report, wherein the resulting saved analytic report is available anytime that the user accesses a person detail page for any enterprise personnel that is/are subordinate to the user.

The analytic report may, for example, characterize the enterprise personnel in accordance with context information available in the person detail page representing the application page.

The fourth example method 460 may further include includes providing a UI control enabling user initiation of a wizard for enabling user selection of one or more fields for the report. The one or more fields for the report may include, for example, one or more of a location field, a salary field, a date range field, and a performance rating field. The date range may be specified via a date-range field corresponding to a first analytic report criterion. A name of a person who is a subject of the analytic report may represent a second analytic report criterion.

The fourth example method 460 may further include including employing additional context information to facilitate automatically determining which data to include in the analytic report, the additional context information including information pertaining to a role of a user of the analytic report and/or the data in one or more transaction page fields. The additional context information may further include custom computer code for facilitating governing which user can create a particular type of analytic report.

The custom computer code may include code for facilitating determining which user can access a particular type of analytic report and what data may be displayed for viewing by the user. The data that may be displayed for viewing by the user may include data that is not limited to a subset of data that may be accessed by enterprise personnel that are superior to the user. The fourth example method 460 may further include automatically generating the custom code in accordance with one or more user selections made in a wizard used to facilitate generating the analytic report.

In summary, in one embodiment, an authoring system allows an author to design a simplified analytic interface that a user can invoke while performing data analysis. The simplified analytic interface can include fields, controls and visualizations pre-set by the author so that the user can work in a more directed fashion according to the author's design, to modify parameters in order to generate reports that include analytics such as charts, grids, pivot grids, etc. Security features allow the author to limit the type of data that can be included in the interface and in the final report.

One embodiment provides a method for creating an analytic report, the method comprising: selecting a database component for analysis; selecting an analytic template, wherein at least one interface element is included in the analytic template; selecting a display option; accepting a signal from a user input device to modify at least one interface element; and providing the analytic report to a user so that when the user uses the modified interface element an analytic report including a chart associated with the interface element is generated for the database component in accordance the analytic template.

Figure 12:
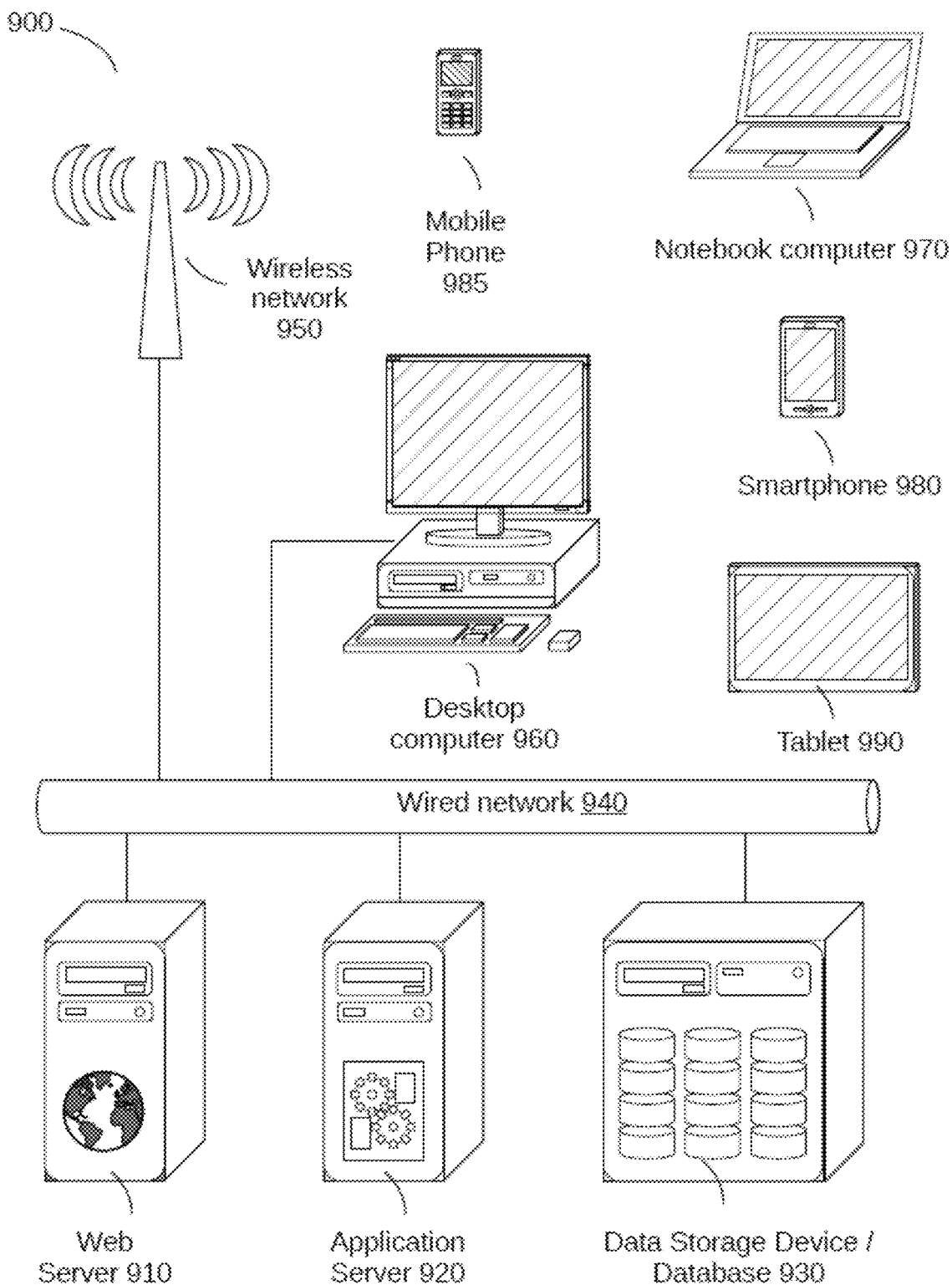
FIG. 12 is a general block diagram of a system and accompanying computing environment usable to implement the embodiments of FIGS. 1-11.

FIG. 12 is a general block diagram of a system 900 and accompanying computing environment usable to implement the embodiments of FIGS. 1-11. The example system 900 is capable of generating and displaying orbit visualizations according to embodiments of the invention. Embodiments may be implemented as standalone applications (for example, residing in a user device) or as Web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating Web pages or other types of electronic documents and UIs, and/or executing applications. Although the system 900 is shown with five user devices, any number of user devices can be supported.

A Web server 910 is used to process requests from Web browsers and standalone applications for Web pages, electronic documents, enterprise data or other content, and other data from the user computers. The Web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other Web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, Web server 910 is implemented as an application running on the one or more general-purpose computers. The Web server 910 and application server 920 may be combined and executed on the same computers.

An electronic communication network 940-950 enables communication between user computers 960-990, Web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, Web server 920, and optionally database 930 can be combined into a single server computer application and system. In a further embodiment, virtualization and virtual machine applications may be used to implement one or more of the application server 910, Web server 920, and database 930.

In still further embodiments, all or a portion of the Web and application serving functions may be integrated into an application running on each of the user computers. For example, a JavaScript application on the user computer may be used to retrieve or analyze data and display portions of the applications.

Figure 13:
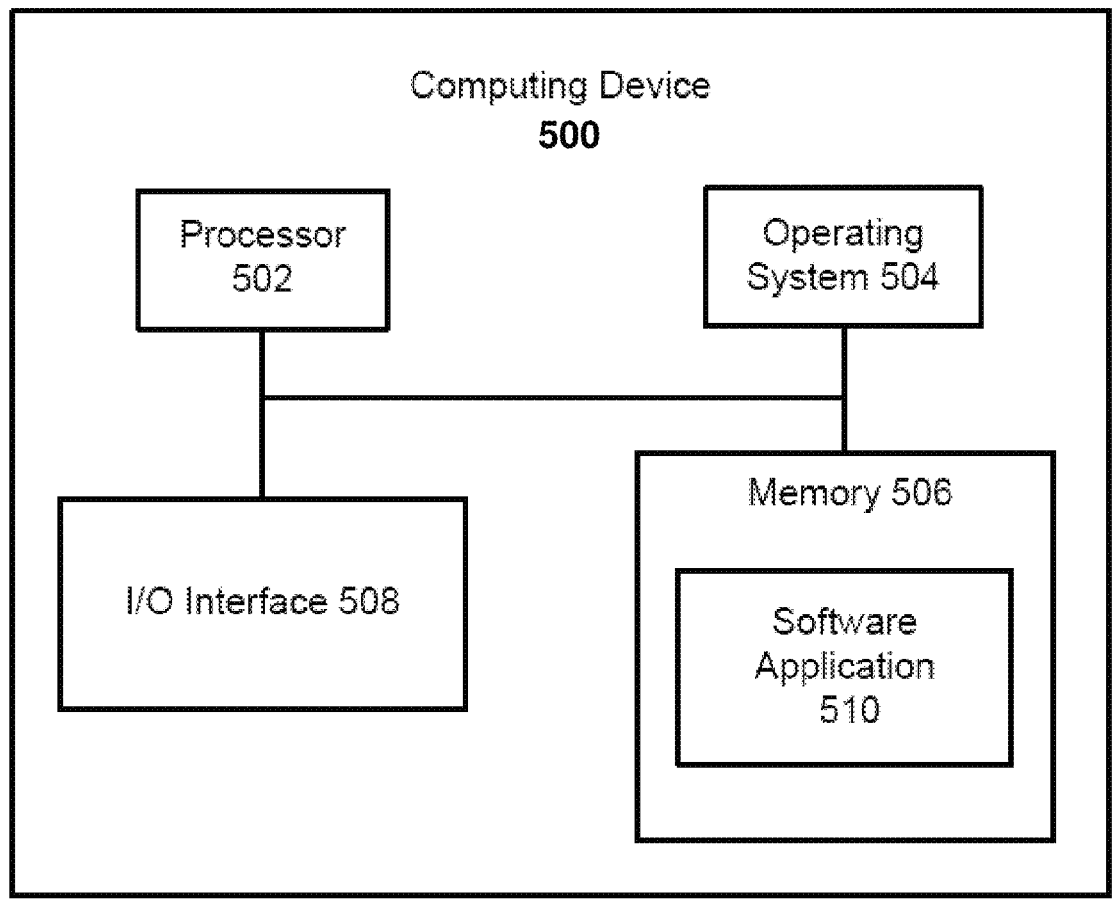
FIG. 13 is a general block diagram of a computing device usable to implement the embodiments of FIGS. 1-12.

FIG. 13 is a general block diagram of a computing device usable to implement the embodiments of FIGS. 1-12. While system 402 of FIG. 13 is described as performing the steps as described in the implementations herein, any suitable component or combination of components of system 402 or any suitable processor or processors associated with system 402 may perform the steps described.

FIG. 13 illustrates a block diagram of an example computing system 500, which may be used for implementations described herein. For example, computing system 500 may be used to implement server devices 910, 920 of FIG. 12 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 13 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address configuration, generation, and use of reusable end user-configurable analytic reports for use in enterprise-computing environments, embodiments are not limited thereto. For example, those skilled in the art with access to the present teachings may readily employ various systems and methods discussed herein to implement generation of configurable UI interface display screens other than analytic reports characterizing enterprise transactions. Systems discussed herein may be readily employed to generate reports for facilitating virtually any type of data analysis involving data retrieved from a database, including, but not limited to data analysis of scientific, military, and university data. Note that the data to be analyzed need not be structured data, but may include relatively unstructured big data collected by server systems.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating creation of analytic reports in a computing environment, the method comprising:

receiving a query from a user to build an analytic report associated with an application page from an analytic template selected from a plurality of analytic templates;

in response to the query, analyzing the association of the application page and context information to determine a subset of analytic templates from the plurality of analytic templates to present to the user associated with a given user role, wherein the context information comprises subject matter characterizing the application page and role-level security that defines user permissions for accessing and displaying types of analytic reports based on user roles, wherein the given user role is subordinate to another user role and at least one or more of the analytic templates are unavailable to the other user role that is superior to the given user role;

determining where to present the subset of analytic templates to the user and presenting the subset of analytic templates to the user based on the determination;

receiving a selection of the analytic template from the subset of analytic templates from the user, wherein the analytic template includes a query definition containing a plurality of database queries of a composite query, wherein the plurality of database queries are filterable based on multilayered security policies, wherein the composite query further comprises access criteria specifying role-level security;

analyzing the query definition to determine configuration information characterizing one or more user interface features to be incorporated into the analytic report, wherein the configuration information includes instructions for collecting the context information to control user accessibility to the analytic template in accordance with the context information, wherein the configuration information contains instructions for generating the composite query used to retrieve selected data from a database in accordance with parameters and information defining the analytic template, obtain the one or more user interface features for incorporation into the analytic report, obtain security data pertaining to security settings configured to filter the plurality of database queries based on multilayered security policies, obtain additional information pertaining to data associated with user interface display screens used to display the analytic report, obtain instructions for retrieving data from live databases, and obtain specification data pertaining to joins of data used to produce joined analytic report data;

employing the configuration information to generate the composite query used to selectively retrieve data from the database, obtain application page data and obtain additional context information used to determine which analytic report data to include in the analytic report, wherein the additional context information further includes data retrieved from one or more user entries responsive to one or more user prompts, the one or more user prompts displayed during configuration of the analytic template and an analytic report that is based on the analytic template;

using the configuration information, the application page data, the additional information, and the composite query to construct the analytic template; and publishing the analytic template to a repository so that the analytic template is accessible to one or more authorized end users of the computing environment with respect to the multilayered security policies, rendering a user interface in a browser of end user clients, and displaying the application page that includes page data derived from the database via the user interface, wherein the application page includes one or more user interface controls that enable user selection of an analytic report associated with the application page, wherein the selected analytic report is generated in response to the user selection by employing a portion of the page data to configure another composite query in accordance with configuration information specified in the analytic report, wherein the user interface includes the application page that includes page fields that provide context used to create another analytic report; and publishing the analytic report to the repository of authorized end users in response to user selection of the one or more user interface controls, wherein the repository is a live multi-tenant database and the analytic report is accessible by the one or more authorized end users via a tile repository.

2. The method of claim 1, wherein the computing environment includes an enterprise-computing environment, and wherein the one or more end users include enterprise personnel.

3. The method of claim 2, wherein the configuration information further includes a first security setting specifying which of the one or more database queries of the analytic template will retrieve data for use by the enterprise personnel in accordance with user role information pertaining to the enterprise personnel.

4. The method of claim 1, wherein the configuration information further includes instructions for obtaining the additional context information pertaining to one or more user interface display screens and data associated therewith, the data pertaining to one or more enterprise transactions that are respectively associated with the one or more user interface display screens.

5. The method of claim 4, wherein the one or more user interface display screens represent one or more enterprise application pages of an enterprise application user interface component.

6. The method of claim 5, wherein the additional context information includes data available in one or more fields of the one or more user interface display screens.

7. A non-transitory processor-readable storage device including instructions executable by a digital processor, the non-transitory processor-readable storage device including one or more instructions for:

receiving a query from a user to build an analytic report associated with an application page from an analytic template selected from a plurality of analytic templates;

in response to the query, analyzing the association of the application page and context information to determine a subset of analytic templates from the plurality of analytic templates to present to the user associated with a given user role, wherein the context information comprises subject matter characterizing the application page and role-level security that defines user permissions for accessing and displaying types of analytic reports based on user roles, wherein the given user role is subordinate to another user role and at least one or more of the analytic templates are unavailable to the other use role that is superior to the given user role;

determining where to present the subset of analytic templates to the user and presenting the subset of analytic templates to the user based on the determination;

receiving a selection of the analytic template from the subset of analytic templates from the user, wherein the analytic template includes a query definition containing a plurality of database queries of a composite query, wherein the plurality of database queries are filterable based on multilayered security policies, wherein the composite query further comprises access criteria specifying role-level security;

analyzing the query definition to determine configuration information characterizing one or more user interface features to be incorporated into the analytic report, wherein the configuration information includes instructions for collecting the context information to control user accessibility to the analytic template in accordance with the context information, wherein the configuration information contains instructions for generating the composite query used to obtain selected data from a database in accordance with parameters and information defining the analytic template, obtain the one or more user interface features for incorporation into the analytic report, obtain security data pertaining to security settings configured to filter the plurality of database queries based on multilayered security policies, obtain additional context information pertaining to data associated with user interface display screens used to display the analytic report, obtain instructions for retrieving data from live multitenant databases, and obtain specification data pertaining to joins of data used to produce joined analytic report data;

employing the configuration information to generate the composite query used to selectively retrieve data from the database, obtain application page data and obtain additional context information used to determine which analytic report data to include in the analytic report, wherein the additional context information further includes data retrieved from one or more user entries responsive to one or more user prompts, the one or more user prompts displayed during configuration of the analytic template and an analytic report that is based on the analytic template;

using the configuration information, the application page data, the additional context information, and the composite query to construct an analytic template;

publishing the analytic template to a repository so that the analytic template is accessible to one or more authorized end users of a computing environment incorporating the non-transitory processor-readable storage device with respect to the multilayered security policies;

rendering a user interface in a browser of end user clients, and displaying the application page that includes page data derived from the database via the user interface, wherein the application page includes one or more user interface controls that enable user selection of an analytic report associated with the application page, wherein the selected analytic report is generated in response to the user selection by employing a portion of the page data to configure another composite query in accordance with configuration information specified in the analytic report, wherein the user interface includes the application page that includes page fields that provide context used to create another analytic report; and publishing the analytic report to the repository for one or more authorized end users in response to user selection of the one or more user interface controls, wherein the repository is a live multi-tenant database and the analytic report is accessible by the one or more authorized end users via a tile repository.

8. The non-transitory processor-readable storage device of claim 7, wherein the computing environment includes an enterprise-computing environment, and wherein the one or more end users include enterprise personnel.

9. The non-transitory processor-readable storage device of claim 8, wherein the configuration information further includes one or more security settings specifying which of the enterprise personnel using the computing environment may access the analytic template in accordance with the user role information pertaining to the enterprise personnel.

10. The non-transitory processor-readable storage device of claim 9, wherein the configuration information further includes a first security setting specifying which of the one or more database queries of the analytic template will retrieve data for use by the enterprise personnel in accordance with user role information pertaining to the enterprise personnel.

11. The non-transitory processor-readable storage device of claim 9, wherein the configuration information further includes instructions for obtaining the additional context information pertaining to one or more user interface display screens and data associated therewith, the data pertaining to one or more enterprise transactions that are respectively associated with the one or more user interface display screens.

12. The non-transitory processor-readable storage device of claim 11, wherein the one or more user interface display screens represent one or more enterprise application pages of an enterprise application user interface component.

13. The non-transitory processor-readable storage device of claim 12, wherein the additional context information includes data available in one or more fields of the one or more user interface display screens.

14. The method of claim 1, further comprising:
receiving, from a user device operated by the user, location information characterizing a current location of the user device;
wherein the context information further comprises the location information.

15. The method of claim 1, wherein generating an analytic report further comprises:
providing one or more user interface controls in the application page, wherein the user interface controls include enabling user selection of an analytic report type from among one or more report types, wherein the one or more report types accessible via the application page depend on the context information and the one or more report types correspond to one or more respective analytic templates;
generating a configurable analytic report based on user-selected analytic report type and associated analytic template, wherein the configurable analytic report including a predetermined visualization is specified via the analytic template;
enabling user configuration of the configurable analytic report via the one or more user interface controls, wherein the configuring includes specification of one or more user selected fields for the analytic reports such as a location and a date range field, and providing a user option to associate the configurable analytic report with the application page so that the report is accessible from the application page by authorized end users.

16. The method of claim 1, further comprising:
saving, prior to displaying the application page the analytic report, wherein underlying composite queries are executed against a live running database in response to the analytic report being selected, such that data used to populate the analytic report represents current data.

17. The method of claim 1, wherein the query definition is an existing query definition saved in the database, modified at runtime and executed while generating and viewing an analytic report, wherein analytic reports reuse the query definition from the analytic report.

\* \* \* \* \*

UNITED STATES PATENT AND TRADEMARK OFFICE
CERTIFICATE OF CORRECTION

PATENT NO. : 10,642,990 B2  
APPLICATION NO. : 15/217836  
DATED : May 5, 2020  
INVENTOR(S) : Pattabhiraman et al.

Page 1 of 1

It is certified that error appears in the above-identified patent and that said Letters Patent is hereby corrected as shown below:

On the Title Page

On page 2, Column 2, item (56) under Other Publications, Line 14, delete "Anlysis;" and insert -- Analysis; --, therefor.

On page 2, Column 2, item (56) under Other Publications, Line 40, delete "putti ng-" and insert -- putting- --, therefor.

On page 3, Column 1, item (56) under Other Publications, Line 12, delete "201O;" and insert -- 2010; --, therefor.

In the Drawings

On sheet 1 of 13, in FIG. 1, under Reference Numeral 30, Line 5, delete "def.s" and insert -- defs. --, therefor.

In the Specification

In Column 12, Line 27, delete "example" and insert -- example, --, therefor.

In Column 16, Line 63, delete "and or" and insert -- and/or --, therefor.

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*